US012657393B1

(12) United States Patent
Mishra et al.

(10) Patent No.: US 12,657,393 B1
(45) Date of Patent: Jun. 16, 2026

(54) LANGUAGE MODEL PROCESSING

(71) Applicant: Amazon Technologies, Inc., Seattle, WA (US)

(72) Inventors: Nimisha Nitin Mishra, Seattle, WA (US); Sri Harsha Reddy Wdaru, Seattle, WA (US); Shiv Ranjini Rajagopal, Mountain View, CA (US); Krishna Kotnana, Sammamish, WA (US); Xiangxing Lu, Bellevue, WA (US); Ismail Enchikalathil Jelal, Seattle, WA (US); Jie Liang, Bothell, WA (US); Elliott George Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 18/678,460

(22) Filed: May 30, 2024

(51) Int. Cl.
| | |
|---|---|
| *G10L 15/18* | (2013.01) |
| *G06F 40/30* | (2020.01) |
| *G10L 15/22* | (2006.01) |
| *G10L 15/26* | (2006.01) |

(52) U.S. Cl.
CPC .............. *G06F 40/30* (2020.01); *G10L 15/18* (2013.01); *G10L 15/22* (2013.01); *G10L 15/26* (2013.01)

(58) Field of Classification Search
CPC ... G10L 15/1822; G10L 15/22; G10L 15/063; G10L 15/1815; G10L 15/30; G10L 2015/223; G10L 15/18; G10L 15/183; G10L 15/16; G10L 15/26; G10L 2015/227; G10L 15/02; G10L 15/07;

G10L 15/197; G06F 40/30; G06F 40/295; G06F 40/35; G06F 40/166; G06F 40/40; G06F 40/56; G06F 40/289; G06F 40/253; G06F 40/216; G06F 3/167; G06F 3/013; G06F 3/0481; G06N 3/09; G06N 20/00
USPC .......................................................... 704/9
See application file for complete search history.

(56) References Cited

U.S. PATENT DOCUMENTS

| | | | | |
|---|---|---|---|---|
| 11,886,826 B1 * | 1/2024 | Bavarian | .............. | G06F 40/253 |
| 11,983,488 B1 * | 5/2024 | Puri | ........................ | G06F 40/30 |
| 12,197,871 B2 * | 1/2025 | Bhowmik | ............ | G06F 40/295 |
| 12,254,878 B1 * | 3/2025 | Rottmann | ............... | G10L 15/26 |
| 12,271,360 B1 * | 4/2025 | Nguyen | ................ | G10L 15/183 |
| 12,271,688 B1 * | 4/2025 | Moreno | ................ | G06Q 10/04 |
| 12,354,603 B1 * | 7/2025 | Lee | .......................... | G06F 40/56 |
| 12,400,652 B1 * | 8/2025 | Fan | ........................ | G10L 15/183 |
| 12,488,796 B1 * | 12/2025 | Copeland | ........... | G10L 15/1822 |
| 2025/0104693 A1 * | 3/2025 | Papayiannis | ........... | G10L 13/10 |
| 2025/0147887 A1 * | 5/2025 | Srinivasan | ........ | G06F 16/90332 |

(Continued)

*Primary Examiner* — Vijay B Chawan
(74) *Attorney, Agent, or Firm* — Pierce Atwood LLP

(57) ABSTRACT

Techniques for applying various optimization strategies to inputs received from an application in order to optimize the processing of a language-model based application are described. The application may opt into one or more optimization strategies. The application may send inputs to an optimization service and the service may apply one or more optimization strategies based on the input type, the application or other factors. Using the optimization strategy may cause the service to retrieve and return cached information associated with the given strategy to the application. After a response to the input is generated by the application, the response may be used by the service to update one or more of the caches of the optimization strategies.

20 Claims, 12 Drawing Sheets

(56)     References Cited

U.S. PATENT DOCUMENTS

2025/0278634 A1* 9/2025 Kumar .................. G06N 3/091
2025/0299675 A1* 9/2025 Lee ..................... G10L 15/1815
2025/0328554 A1* 10/2025 Iyengar .............. G06F 16/3329

* cited by examiner

FIG. 5

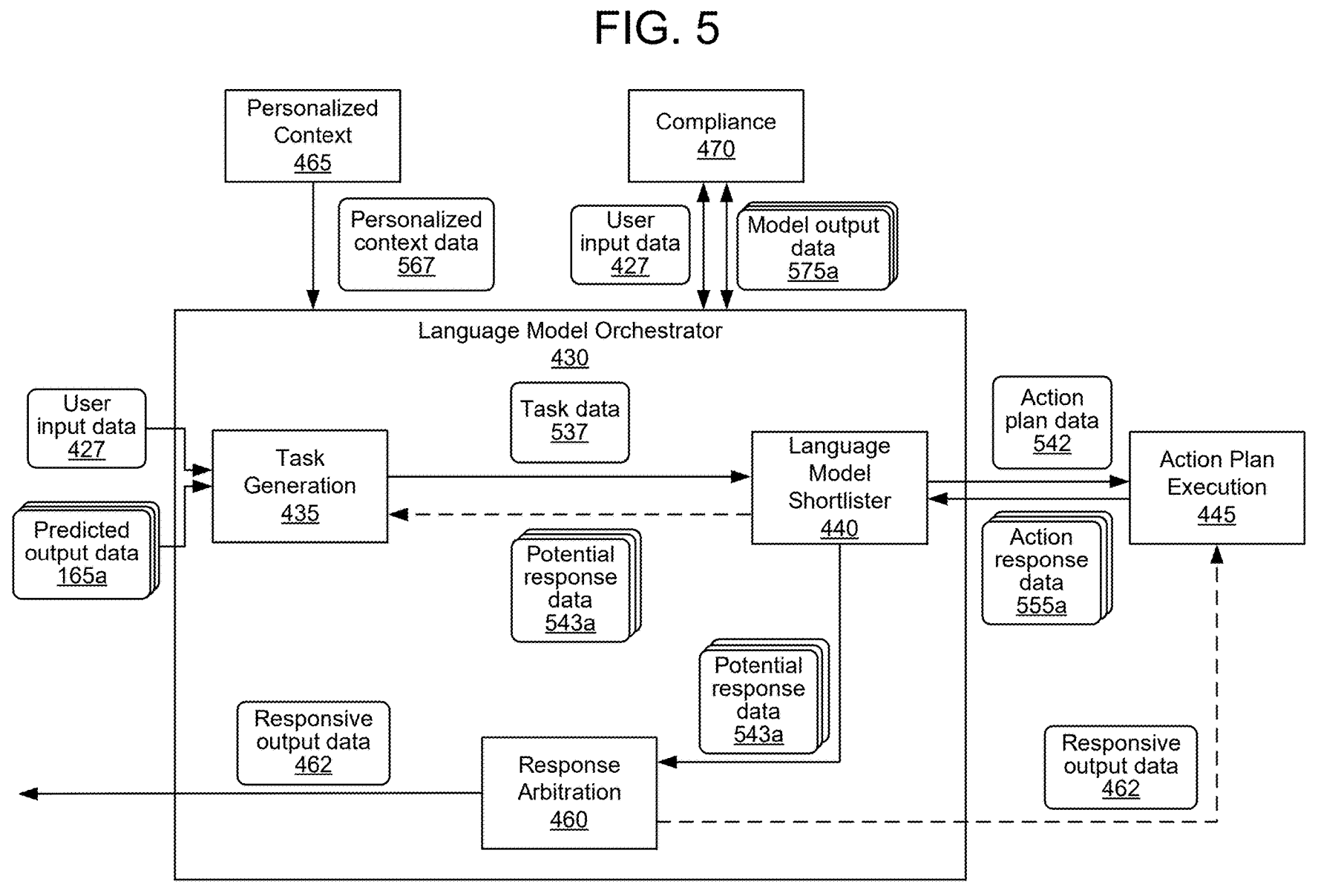

Personalized Context 465

Personalized context data 567

Compliance 470

Model output data 575a

User input data 427

Language Model Orchestrator 430

Action Plan Execution 445

Action plan data 542

Action response data 555a

Responsive output data 462

Language Model Shortlister 440

Potential response data 543a

Task data 537

Potential response data 543a

Response Arbitration 460

Task Generation 435

Responsive output data 462

User input data 427

Predicted output data 165a

FIG. 7

LANGUAGE MODEL PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 is a conceptual diagram illustrating example components and processing of a language model orchestrator component of the system, according to embodiments of the present disclosure.

FIG. 7 is a block diagram conceptually illustrating example components of a device, according to embodiments of the present disclosure.

DETAILED DESCRIPTION

Figure 1A:
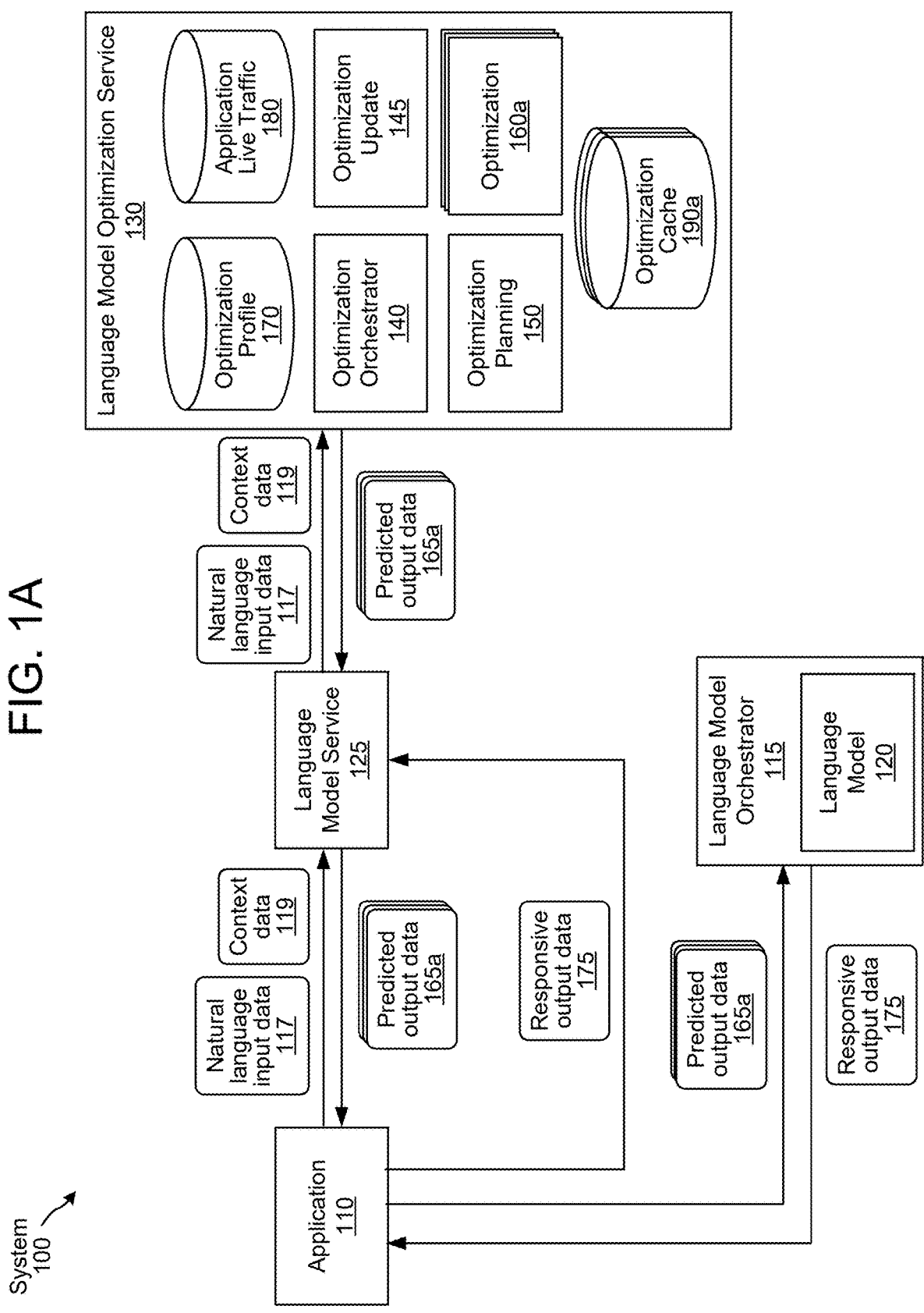
FIG. 1A is a conceptual diagram illustrating example components and processing of a system to optimize language model processing with respect to a language model-based application, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Synthetic speech generation (SSG) (sometimes referred to as text-to-speech (TTS)) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech is a field of computer science, artificial intelligence, and linguistics in which embedding data is generated to represent speech in audio data and, using one or more models, the embedding data is processed to generate audio data and/or a system command responsive to the speech. Language modeling (LM) is the use of various statistical and probabilistic techniques to determine the probability of a given sequence of words occurring in a sentence. LM can be used to perform various tasks including understanding a natural language input (e.g., when noise is present) and performing generative tasks that involve generating natural language output data.

Certain systems may be configured to respond to (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input. A system may also receive a user input in the form of text, such as a text input from a computer, phone, or other device.

In some instances, the system may be configured to process input text data (such as ASR data or text entered into a user interface) using one or more language models (e.g., large language models (LLMs)) to determine a response to the user input. For example, in response to a user input of "what is the history of the National Football League," the language model may output a synopsis of the history of the National Football League.

In some instances, language model-based applications, e.g., applications that utilize language models, among other things, to generate responses to received inputs, may involve increased resource usage (e.g., in terms of cost, time, processors, etc.) and higher latency relative to other applications/systems. Certain optimizations can be applied in order to address the resource usage and latency issues. The present disclosure describes, among other things, a service to apply one or more optimization strategies/techniques in order to optimize processing of a language model(s) for an application. The present disclosure also describes techniques for identifying modifications to an optimization strategy/technique based on prior performance of an optimization strategy and/or a change in the live traffic corresponding to the application. The present disclosure additionally describes techniques for updating caches associated with the service such that the service can dynamically learn to apply particular optimization strategies/techniques to a given input based on the processing performed by the particular optimization strategies (or one or more other optimization strategies) to optimize the language model for the application.

In some embodiments, the service may receive an input from an application, where the input may be a user input to the application. The application may be a language model-based application, in that the application may use a language model to process the user input. The application may be a remotely located component(s) configured to interact with a user device to generate a response and/or perform an action responsive to a user request. The service may include one or more components configured to process according to one or more optimization strategies. The individual components may query corresponding data storages (e.g., caches) using the input to retrieve historical response data corresponding to a previously received input similar (e.g., semantically similar, such as using a cosine similarity) to the current input. The historical response data may be used to generate a response to the current user input. In some example embodiments, the process performed to generate the response using the historical response data may be based on the optimization strategies applied to determine the historical response data. For example, for optimization strategies associated with speculative decoding techniques, the historical response data may be sent to a language model, which may process the historical response data to generate the response. For further example, for optimization strategies configured to bypass the processing of the language model, the application may directly use the historical response data as the response or may process the historical response data to generate the response.

As used herein, an optimization strategy (also referred to herein as an optimization technique) may involve use of one or more techniques to reduce resource usage and latency with respect to language model processing. The techniques may involve using stored/cached data determined to be similar (e.g., semantically similar, such as based on a cosine similarity) to a current input, retrieval methods/algorithms, rules-based engine, etc. An optimization strategy may be implemented using one or more system components as described below. Examples of optimization strategies include: (a) speculative decoding techniques, where speculative tokens potentially responsive to a current user input are retrieved and provided to a language model, which may verify the speculative tokens in parallel to generating a corresponding response to the user input; (b) inference data chunking, where processing performed when generating a previous/past response is separated into chunks according to particular tasks and the chunks are retrieved and provided to the language model to begin processing of a current user input with respect to the tasks in parallel; (c) language model bypassing, where a previous response is identified to be deterministic for a current user input is retrieved and provided directly to the application as the current response, thereby bypassing the processing of a language model; (d) routing to smaller, more efficient language models, where the current user input is routed to a language model that may be smaller and more efficient in terms of compute as compared to other language models available in the system, and the current user input may be routed based on a category associated with the user input; and (e) action plan retrieval, where an actions plan(s) including a directive(s) for a component(s) to generate information responsive to a current input are retrieved and sent to the application to be used by a user device local to a user to generate a response to the current user input.

The service may determine which optimization strategy to apply based on an application registering/registered with the service. In some example embodiments, the optimization strategies to be applied may be determined based on the application (e.g., a developer of the application) opting into the optimization strategies. In some example embodiments, the service may recommend one or more optimization strategies based on, for example, analyzing the inputs received from the application and stored by the service, the type of inputs corresponding to the application, context information associated with the inputs or application, etc.

In some example embodiments, the service may be configured to periodically recommend to an application a modified set of optimization strategies. For example, the service may periodically analyze inputs received from the application to determine whether a change in the application traffic indicates that different optimization strategies should be applied, rather than the current optimization strategies. For further example, the service may, additionally or alternatively, periodically analyze performance metrics associated with a current set of optimization strategies being applied to inputs received from the application to recommend a modified set of optimization strategies. The performance metrics may include a latency of the processing performed by the optimization strategies, a comparative latency representing a total latency gain/decrease between the latency of the processing performed by the optimization strategies and the average latency of the processing performed by the language model without the assistance of the optimization strategies, an accuracy of the historical response data determined by the optimization strategies, which may represent how often the historical response data was the same as the final response received from the application and/or the average number of tokens included in the historical response data that were also included in the final response, a cache hit accuracy representing how often a cache(s) associated with the optimization strategies returned historical response data in response to a query associated with an input received from the application, a user satisfaction score representing a satisfaction of users of the application with the responses generated using the optimization strategies.

In some embodiments, the service may be configured to update the caches corresponding to the optimization strategy to include information based on final responses generated for a given user input. For example, after a final response is generated (by the application/language model) based on the retrieved historical response data, the final response may be sent to the service, which may update the caches based thereon. For example, a cache corresponding to the optimization strategy used in the instant case may be updated to include the final response or information determined during generation of the final response (e.g., various model outputs associated with various tasks, action plans including directives for components to generate responsive information, etc.).

In some example embodiments, the service may be configured to update the caches to include further information based on a performance of the optimization strategy. For example, the system may send the response (and/or information determined during generation of the response, such as model outputs and/or actions plan) to the cache along with an indication of whether the optimization strategy's performance was satisfactory or unsatisfactory, which may be determined based on latency, accuracy, cache hit rate, user satisfaction, etc.

Teachings of the present disclosure provide, among other things, improved computer processing for language model-based applications by enabling the application to use various optimization strategies, which may be dynamically applied on an input-to-input basis, based on a prior performance of the optimization strategies, and/or feedback received from users or the applications. The techniques described herein can reduce latency and improve resource usage by language model-based applications.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Language models analyze bodies of text data to provide a basis for their word predictions. The language models are generative models. In some embodiments, one or more of the language models may be a large language model (LLM). A language model (e.g., a LLM) is an advanced artificial intelligence system designed to process, understand, and generate human-like text based on relatively large amounts of data. In some embodiments, a language model (or another type of generative model) may be further designed to process, understand, and/or generate multi-modal data including audio, text, image, and/or video. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. An LLM uses an expansive training dataset, as compared to a relatively smaller language model, and can include a relatively large number of parameters (in the range of billions, trillions or more), hence, they are called "large" language models. In some embodiments one or more of the language models (and their corresponding operations, discussed herein) may be the same language model.

An artificial intelligence (AI) system may use ASR, NLU, NLG, and/or TTS, each with or without a language model, for processing user inputs, including natural language inputs (e.g., typed and spoken inputs).

In some embodiments (e.g., where one or more of the language models are LLMs), the language models may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the language model(s) may be capable of in-context learning. Examples of such language models include some of the Amazon Alexa and AWS Titan family of generative models.

In other embodiments (e.g., where one or more of the language models are an LLM), the language model may be a decoder-only architecture. The decoder-only architecture may use left-to-right (unidirectional) encoding of the input (e.g., audio, text, image, video, etc.). Examples of such language models include some of the Amazon Alexa and Amazon Web Services (AWS) Titan family of generative models as well as the Generative Pre-trained Transformer 3 (GPT-3) and other versions of GPT. GPT-3 has reportedly a capacity of (approximately) 175 billion machine learning parameters.

Other examples of language models (e.g., LLMs) include BigScience Large Open-science Open-access Multilingual Language Model (BLOOM), Language Model for Dialogue Applications model (LaMDA), Bard, Large Language Model Meta AI (LLaMA), etc.

In some embodiments, the system may include one or more machine learning models instead of or in addition to the language model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments, the input to the language model may be in the form of a prompt. A prompt may be a natural language input, for example, a directive or request, for the language model to generate an output according to the prompt. The output generated by the language model may be a natural language output responsive to the prompt. In some embodiments, the output may additionally or instead be another type of data, such as audio, image, video, etc. The prompt and the output may be text in a particular language (e.g., English, Spanish, German, etc.). For example, for an example prompt "how do I cook rice?", the language model may output a recipe (e.g., a step-by-step process represented by text, audio, image, video, etc.) to cook rice. As another example, for an example prompt "I am hungry. What restaurants in the area are open?", the language model may output a list of restaurants near the user that are open at the time of the user prompt.

The language models may be configured using various learning techniques. For example, in some embodiments, the language models may be configured using few-shot learning. In few-shot learning, the model learns how to learn to solve the given problem. In this approach, the model is provided with (e.g., in the prompt) a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example (e.g., in the prompt). As another example, in some embodiments, the language models may be configured using zero-shot learning. In zero-shot learning, the model solves the given problem without examples of how to solve the specific/similar problem and just based on the model's training dataset. In this approach, the model is provided with data not observed during training, and the model learns to generate an appropriate output based on its learning of other data.

Figure 1B:
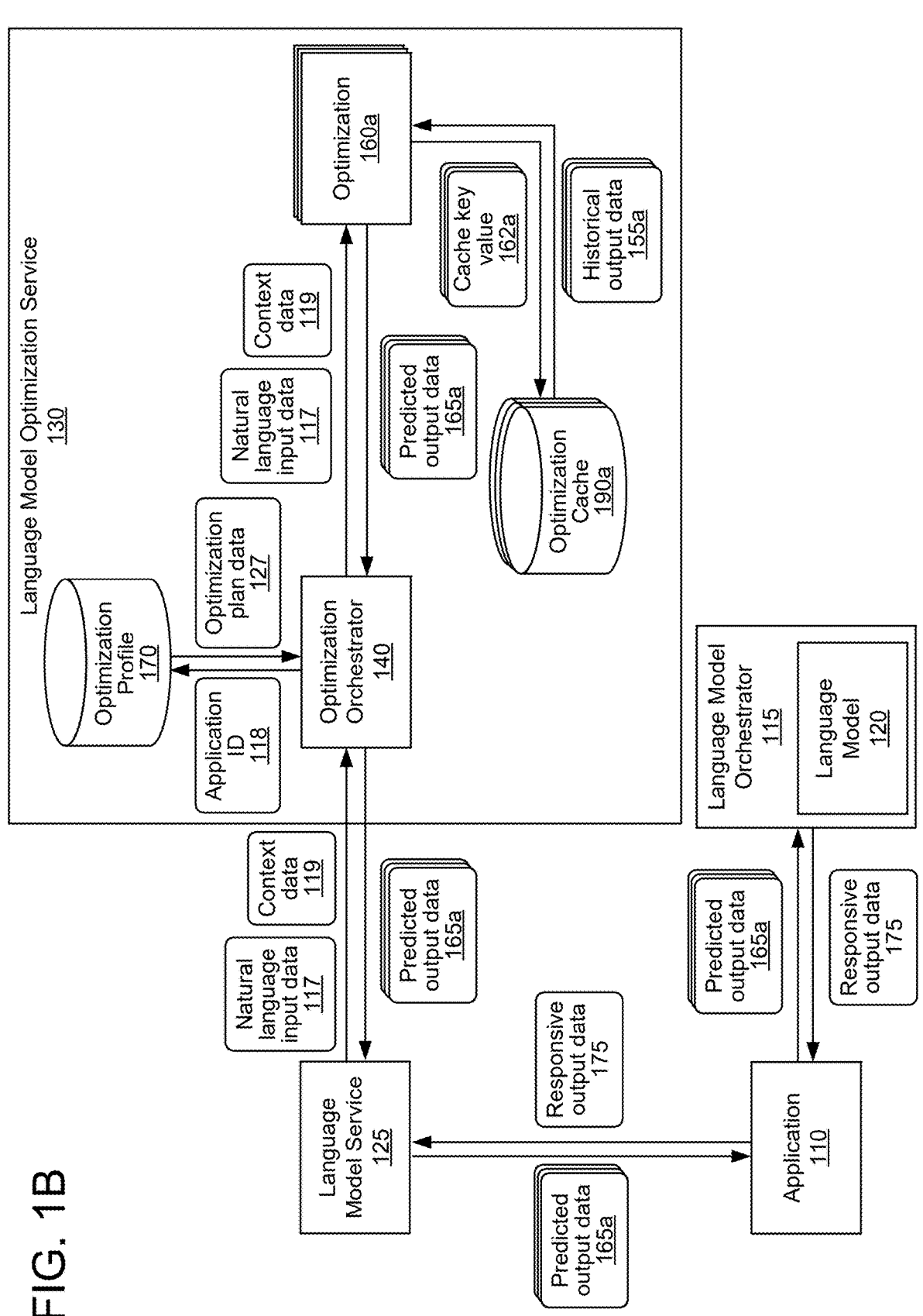
FIG. 1B is a conceptual diagram illustrating example components and processing of a language model optimization service of the system that is configured to optimize language model processing with respect to the language model-based application, according to embodiments of the present disclosure.
Figure 1C:
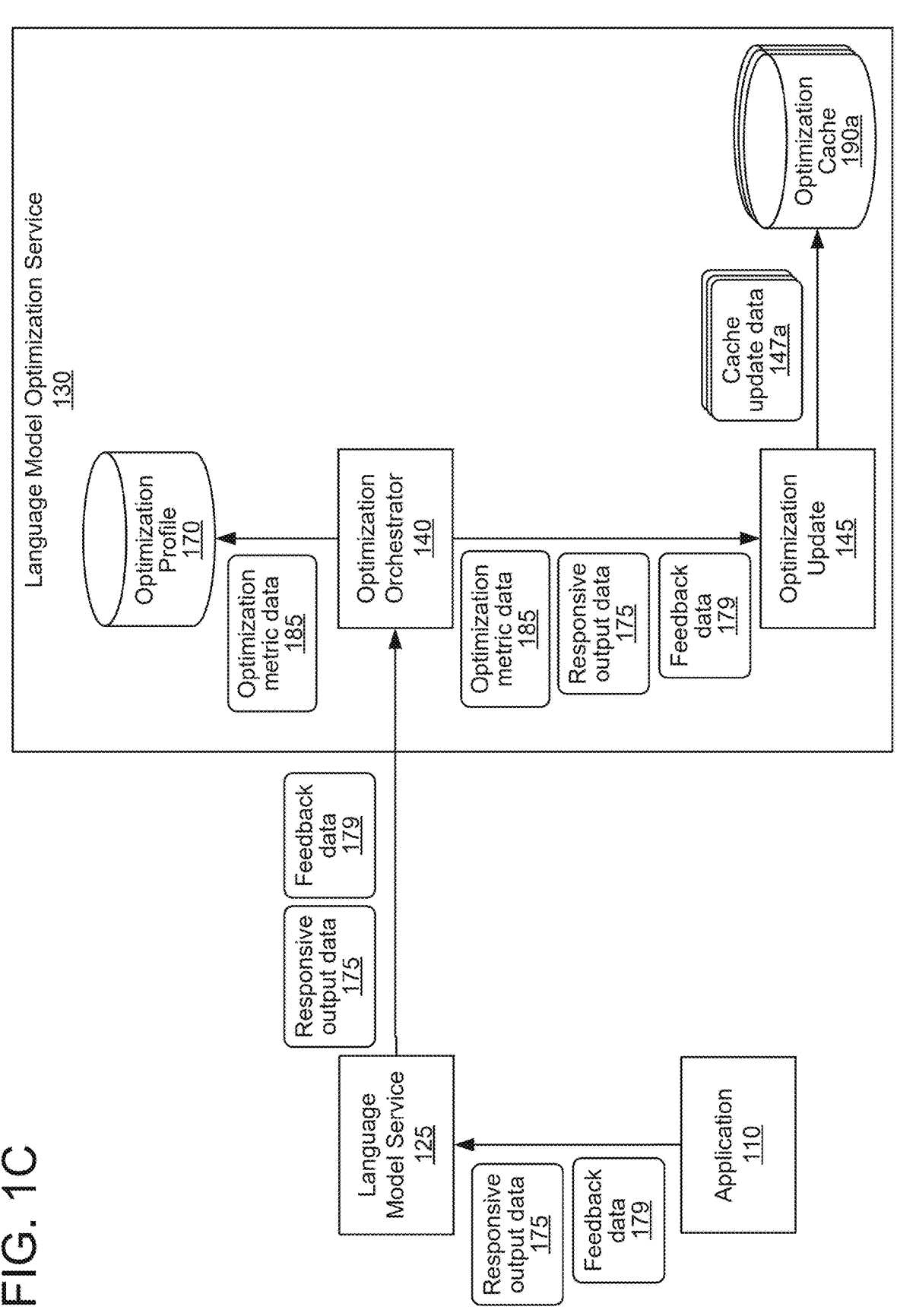
FIG. 1C is a conceptual diagram illustrating example components and processing of the language model optimization service to update one or more optimization caches based on a response generated based on the processing performed by the language model optimization service, according to embodiments of the present disclosure.

FIGS. 1A-C are conceptual diagrams of an example system 100 for optimizing processing performed by a language model of an application to generate a response to a user input corresponding to the application. As shown in FIG. 1A, the system 100 may include an application 110, a language model service 125, and a language model optimization service 130.

The application 110 may be a language model-based application, in that the application 110 may use a language model 120 to process a received input. In some embodiments, the application 110 may send data (e.g., requests, input data, directives, etc.) to cause processing by a language model 120. In some embodiments, the application 110 may send the data to a language model orchestrator component 115 that may include (or may be in communication with) the language model 120. The application 110 may be a component(s) configured to interact with a user 405 and/or a user device 410 (shown in FIG. 4) to generate a response and/or perform an action responsive to a user request. For example, the application 110 may correspond to the system component(s) 420 discussed herein, which may be located remote from the user 405 and/or the user device 410. The language model 120 may be a generative model (e.g., a generative model, such as one or more of the Amazon family of generative models, a generative pretrained transformer (GPT) model, a Bidirectional Encoded Representations for Transformers (BERT) model, or any other transformer-based model/large language model). In some embodiments, the language model 120 may correspond to one or more of the language models discussed herein with respect to FIGS. 4-5. For example, the language model 120 may correspond to a language model orchestrator component 430, a task generation component 435, a task determination language model 437, a task selection language model 439, a language model shortlister component 440, a shortlister language model 443, a response arbitration component 460 and/or a response language model 463, as is discussed in detail herein with respect to FIGS. 4-5. In some embodiments, the language model 120 may be associated with/correspond to the application 110, such that the language model 120 is configured to generate responses received by the application 110.

The language model optimization service 130 may include an optimization orchestrator component 140, an optimization update component 145, an optimization planning component 150, an optimization component(s) 160a-n, an optimization profile storage 170, an application live traffic storage 180, and one or more optimization caches 190a-n.

As illustrated in FIG. 1A, natural language input data 117 is received at the language model service 125 from the application 110. The natural language input data 117 may correspond to a user-provided input, such as text (e.g., a text or tokenized representation of a user input, which may be provided by the user/output by a component of the system (e.g., an ASR component 650)). The natural language input data 117 may be sent to the language model service 125 from the language model orchestrator component 115 of the application 110. The language model orchestrator component 115 may be configured to orchestrate the processing performed by the language model 120 to generate responses to user inputs.

In some embodiments, the language model service 125 may receive other input data, which may be processed in a similar manner as the natural language input data 117 as described herein. The other input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching a user device 410, a user entering the home, etc.). In some embodiments, the system 100 may process such input data as described herein. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data (for example, "the kitchen timer expired").

In some embodiments, the processing described herein with respect to the language model optimization service 130 may be performed for the application 110 in response to the application 110 registering with the language model optimization service 130/subscribing to the services of the language model optimization service 130. For example, the application 110 (or a developer associated with the application 110) may indicate, such as through an interface provided by the language model service 125/the language model optimization service 130, that the language model optimization service 130 is to interact with the application 110 to optimize language model processing performed to generate responses to inputs received by the application 110. Thereafter, the application 110 may send inputs (e.g., live traffic, such as the natural language input data 117) to the language model service 125 that are to be processed by the language model optimization service 130 as discussed herein.

As illustrated in FIG. 1A, the language model service 125 may further receive context data 119 associated with the natural language input data 117. The context data 119 may correspond to various contextual information associated with the natural language input data 117, such as, for example, a user ID corresponding to the user 405 associated with the natural language input data 117, user profile information (e.g., user behavioral information, user preferences, user settings, user demographics, historical user interaction data, devices/device IDs associated with the user profile), a device ID associated with the natural language input data 117, device profile information (e.g., device states, an indication of the last time the device was online (e.g., powered on and connected to the Internet), historical device interaction data, etc.), other contextual signals (e.g., weather information, time of day, and/or geographic location), etc. In some embodiments, the context data may further include dialog history data representing one or more user inputs and corresponding system-generated responses for a current interaction or past interaction(s) between the user and the system 100. In some embodiments, the context data may further include information associated with the application 110, such as an application ID (e.g., the application ID 118, as illustrated in FIG. 1B).

The language model service 125 may send the natural language input data 117 and the context data 119 to the language model optimization service 130. In some embodiments, the application 110 may provide the natural language input data 117 and the context data 119 to the language model service 125 as part of a directive (e.g., a GET request, such as a component/Application Programming Interface (API) call) usable to cause the language model optimization service 130 to provide information (e.g., predicted output data 165a-n) based on the natural language input data 117 and the context data 119. Based on the received directive, the language model service 125 may provide the natural language input data 117 and the context data 119 to the language model optimization service 130 along with a directive to provide the corresponding information.

The language model optimization service 130 may use the natural language input data 117 and the context data 119 to generate predicted output data 165a-n corresponding to information predicted to be responsive to the natural language input data 117. The language model optimization service 130 may generate the predicted output data 165a-n using the optimization component(s) 160a-n. Individual predicted output data may correspond to an individual optimization component (e.g., the predicted output data 165a may be generated by the optimization component 160a).

The optimization orchestrator component 140 may be configured to orchestrate (e.g., manage, route data, causing execution, etc.) the processing performed by the various components of the language model optimization service 130.

The optimization planning component 150 may be configured to identify one or more of the optimization component(s) 160a-n to be used for optimizing processing of the language model 120 with respect to (user inputs received from) the application 110. The optimization planning component 150 may further be configured to modify which of the particular optimization component(s) 160a-n to be used for optimizing processing of the language model with respect to the application 110, as the optimization component(s) 160a-n process with respect to inputs associated with the application 110. As is discussed herein in connection with FIG. 2, the optimization planning component 150 may determine the one or more optimization component(s) 160a-n to be used to optimize the processing of the language model 120 with respect to the application 110 based on live traffic data 210a-n stored in application live traffic storage 180 associated with the application 110 and/or optimization metric data 215 stored in optimization profile storage 170 associated with processing performed by the optimization component(s) 160a-n with respect to inputs associated with the application 110.

The optimization component(s) 160a-n may be configured to implement various optimization techniques, examples of which are discussed in detail herein in connection with FIGS. 3A-3E. For example, an optimization component 160a may be configured to implement speculative decoding processing to determine speculative tokens predicted to be responsive to a user input, which are to be verified by the language model 120. For further example, an optimization component 160b may be configured to determine predicted model outputs associated with various tasks performed to generate a response to a user input, which may be used by the language model 120 to perform processing according to the tasks concurrently/at least partially in parallel. As another example, an optimization component 160c may be configured to determine a predicted, deterministic response to a user input, thereby bypassing the processing of the language model 120. As an additional example, an optimization component 160d may be configured to determine a smaller, more efficient language model to generate a response to a user input, rather than the language model 120. As an even further example, an optimization component 160e may be configured to determine an action plan including directives (e.g., component/API calls) for a component(s) to generate information responsive to a user input, which may be used by a user device 410 local to a user 405 associated with the user input to generate a response to the user input.

In some embodiments, the optimization component(s) 160a-n may be configured to interact with the optimization cache(s) 190a-n to perform the abovementioned processing. For example, an optimization component 160a may be configured to interact with an optimization cache 190a associated with the optimization component 160a. The optimization cache(s) 190a-n may store various information usable by the optimization component(s) 160a-n to implement their corresponding optimization techniques. For example, the optimization cache(s) 190a-n may include user inputs received from the application 110 and corresponding responses that were generated by the language model 120. For further example, the optimization cache(s) 190a-n may include user inputs, model outputs associated with one or more tasks performed the language model 120 to generate the responses to the user inputs, and the corresponding responses. As another example, the optimization cache(s) 190a-n may include user inputs received from the application 110 that are determined to be deterministic (e.g., user inputs that result in the same/similar responses) and their corresponding responses. As an additional example, the optimization cache(s) 190a-n may include user inputs received from the application 110 that are determined to be processable by smaller, more efficient models, rather than the language model 120, and their corresponding responses. As an even further example, the optimization cache(s) 190a-n may include user inputs received from the application 110, their corresponding responses, and one or more action plans.

The optimization profile storage 170 may be a storage including one or more profiles corresponding to one or more applications, such as the application 110. The profiles may include various information associated with the applications. For example, a profile for a particular application may include an indication of one or more optimization component(s) 160a-n that are to be used to optimize the processing of the language model 120 with respect to the application 110 (e.g., which of the optimization component(s) 160a-n the application 110 has opted into) and performance metrics associated with the one or more optimization component(s) 160a-n (e.g., optimization metric data, as discussed herein), such as a latency gain/decrease score, a predicted output accuracy score, a cache hit score, a user satisfaction score, and a cache accuracy score. In some embodiments, the profile for a particular application may further include a ranking/preference of the optimization component(s) 160a-n provided by the language model optimization service 130 indicating which of the optimization component(s) 160a-n are performing the best with respect to inputs from the application 110/are preferred by the application 110 (or a developer of the application 110). In some embodiments, the ranking/preference may be indicated by the application 110, e.g., as part of the optimization plan data 230 discussed herein. In other embodiments, the ranking/preference may be determined based on the processing performed by the optimization planning component 150, as discussed herein.

The application live traffic storage 180 may be a storage including live traffic data, such as inputs received from the application 110. In some embodiments, live traffic data may be stored in the application live traffic storage 180 after applying anonymization techniques to remove any user identifiable data and/or other sensitive (e.g., personal, confidential, and/or privileged) information. In some embodiments, the live traffic data may include, for example, the user input data 427 discussed herein in connection with FIGS. 4-5.

The optimization component(s) 160*a-n* associated with the application 110 may process to generate predicted output data 165*a-n* corresponding to information associated with the optimization strategies/techniques corresponding to the optimization component(s) 160*a-n* and usable to generate a response to the natural language input data 117, which may be sent to the language model service 125. The language model service 125 may send the predicted output data 165*a-n* to the application 110. Thereafter, the language model service 125 may receive responsive output data 175 from the application 110.

In some embodiments, the responsive output data 175 may be generated using the language model 120. For example, the application 110 may the predicted output data 165*a-n*, the natural language input data 117, and the context data 119 to the language model orchestrator component 115, which may cause the language model 120 to process to generate the responsive output data 175. In other embodiments, the responsive output data 175 may correspond to one or more items of the predicted output data 165*a-n*, which may be responsive to the natural language input data 117, without the predicted output data 165*a-n* being sent to the language model orchestrator component 115, as discussed herein.

In some embodiments, whether the responsive output data 175 is generated by the language model 120 or corresponds to one or more of the predicted output data 165*a-n* may be based on the optimization technique associated with the optimization component(s) 160*a-n* that generated the predicted output data 165*a-n*. In other words, certain optimization component(s) 160*a-n* may be configured to generate predicted output data 165*a-n* that is to be used by the language model 120 to generate the responsive output data 175, whereas other optimization component(s) 160*a-n* may be configured to generate predicted output data 165*a-n* that is to be directly used as the responsive output data 175/ usable to generate a response to the natural language input data 117 without the processing of the language model 120 being performed. For example, predicted output data 165*a* generated by an optimization component(s) 160*a* configured to use speculative processing techniques to generate predicted output data may be sent to the language model 120 for verification to generate the responsive output data 175, as discussed herein. For further example, predicted output data 165*b* generated by an optimization component(s) 160*b* configured to generate predicted output data corresponding to one or more model outputs may be sent to the language model 120 to perform one or more tasks in parallel. As another example, predicted output data 165*c* generated by an optimization component(s) 160*c* configured to generate predicted output data corresponding to a deterministic response may be directly used by the application 110 as the responsive output data 175, thereby bypassing the language model 120.

As an additional example, predicted output data 165*d* generated by an optimization component(s) 160*d* configured to generate predicted output data using one or more additional, more efficient language models, instead of the language model 120, may be directly used by the application 110 as the responsive output data 175. As an even further example, predicted output data 165*e* generated by an optimization component(s) 160*e* configured to generated predicted output data corresponding to an action plan may be directly used by the application 110 as the responsive output data 175 to be used by a user device 410 to generate a response to the natural language input data 117.

The application 110 may be configured to cause presentation of the responsive output data 175 (or a response generated using the responsive output data 175) to a user 405 associated with the natural language input data 117. For example, the application 110 may be configured to send the responsive output data 175 to a user device 410 associated with the user 405. For further example, where the application 110 corresponds to the user device 410, the application 110 may directly present the responsive output data 175 to a user 405. In some embodiments, the application 110/user device 410 may process the responsive output data 175 to generate synthesized speech (e.g., using an SSG component 656) corresponding to the responsive output data 175.

FIG. 1B illustrates example processing of the language model optimization service 130 of the system 100 that is configured to optimize language model processing with respect to the language model-based application. As shown in FIG. 1B, the natural language input data 117 and the context data 119 are received at the optimization orchestrator component 140. The optimization orchestrator component 140 may retrieve optimization plan data 127 from the optimization profile storage 170, which may indicate one or more optimization component(s) 160*a-n* that are to be used to optimize the processing of the language model 120 with respect to inputs received from the application 110. In some embodiments, the optimization plan data 127 may be stored in the optimization profile storage 170 in response to receiving an indication from the application 110 of one or more optimization components for which the application 110 is to be opted into, as discussed herein in connection with FIG. 2. As shown in FIG. 1B, the optimization plan data 127 may be retrieved from the optimization profile storage 170 using an application ID 118, which may be associated with the application 110. In some embodiments, the application ID 118 may be included in the context data 119.

Using the optimization plan data 127, the optimization orchestrator component 140 may identify one or more of the optimization component(s) 160*a-n* that are to be used to generate the predicted output data 165*a-n*. The optimization orchestrator component 140 may send the natural language input data 117 and the context data 119 to the optimization component(s) 160*a-n* indicated by the optimization plan data 127. In some embodiments, the optimization orchestrator component 140 may send the natural language input data 117 and the context data 119 to a top-ranked/preferred optimization component(s) 160*a-n*, which may be indicated in the optimization plan data 127 as discussed herein. If the top-ranked/preferred optimization component(s) 160*a-n* is unable to generate the predicted output data 165*a-n*, then the natural language input data 117 and the context data may be sent to a next top-ranked/preferred optimization component(s) 160*a-n* until predicted output data is generated and returned.

The optimization component(s) 160*a-n* may be configured to retrieve historical output data 155*a-n* from one or more of the optimization cache(s) 190*a-n* associated with the optimization component(s) 160*a-n*. The historical output data 155*a-n* may correspond to output data (e.g., responses output by the system 100 or generated by the system 100, model output data generated by the language model 120, etc.) responsive to a previous user input and/or associated with a response to a previous user input. The historical output data 155*a-n* may be retrieved from the optimization cache(s) 190*a-n* based on their being similar (e.g., semantically similar, which may be determined using a cosine similarity) to the natural language input data 117 and, optionally, the context data 119. An optimization component(s) 160*a-n* may be applied to a particular input (e.g., may perform the processing described herein to generate the predicted output data 165*a-n*) based on the optimization cache(s) 190*a-n* associated with the optimization component(s) 160*a-n* returning historical output data 155*a-n* (referred to herein as a "cache hit") based on a query from the optimization component(s) 160*a-n* associated with the natural language input data 117 and, optionally, the context data 119. Retrieving the historical output data 155*a-n* from the optimization cache(s) 190*a-n* associated with the optimization component(s) 160*a-n* may indicate to the optimization components(s) 160*a-n*/the language model optimization service 130 that the corresponding optimization component(s) 160*a-n* is appropriate for optimizing the processing of the language model 120 with respect to the natural language input data 117. As such, the optimization component(s) 160*a-n* may be dynamically applied to natural language input data received by the application 110 to generate predicted output data based on the given natural language input data.

As shown in FIG. 1B, the optimization component(s) 160*a-n* may generate cache key values 162*a-n* to retrieve the historical output data 155*a-n* from the optimization cache(s) 190*a-n*. In some embodiments, a cache key value 162*a* may correspond to the natural language input data 117 and, optionally, one or more portions of the context data 119 (e.g., a concatenated/appended/encoded representation of the natural language input data 117 and the one or more portions of the context data 119). In some embodiments, the historical output data 155*a-n* may include (or be sent along with) an indication of the similarity (e.g., semantic similarity) of the historical output data 155*a-n* to the cache key values 162*a-n*.

In some embodiments, the optimization cache(s) 190*a-n* may include personalized caches that include information associated with a particular user and global caches that are associated with a global set of users. In some embodiments, an optimization cache(s) 190*a* may correspond to/include a global, optimization cache and one or more personalized, optimization caches associated with an optimization component(s) 160*a*. As such, in some such embodiments, the optimization component(s) 160*a-n* may be configured to use the cache key values 162*a-n* to query for the historical output data 155*a-n* from historical, personalized caches of the optimization cache(s) 190*a-n* that are associated with a user 405 associated with the natural language input data 117. For example, an optimization component(s) 160*a* may query for historical output data 155*a* from a corresponding optimization cache(s) 190*a* associated with the user 405 using a user ID associated with the user 405, which may be included in the context data 119. If a cache miss occurs (e.g., no historical output data 155*a-n* is retrieved from the optimization cache(s) 190*a*), then the optimization component(s) 160*a* may query for the historical output data 155*a* from a corresponding global optimization cache.

In some embodiments, a global, optimization cache may include a portion of historical output data 155*a*, but may not include a portion of the historical output data 155*a* that is personalized to a particular user 405 (e.g., personally identifiable information, confidential information, sensitive information, etc.), which may be instead stored in the corresponding personalized, optimization cache. The portion of the historical output data 155*a* stored in the global optimization caches may instead include an indication of a slot to be filled by the personalized portion of the historical output data 155*a*. In some such embodiments, the optimization component(s) 160*a-n* may be configured to query both their corresponding global optimization cache and their corresponding personalized optimization cache associated with the user 405 corresponding to the natural language input data 117. Thereafter, the optimization component(s) 160*a* may fill in the slot indicated by the portion of the historical output data 155*a* retrieved from the global optimization cache with the portion of the historical output data 155*a* retrieved from the personalized optimization cache.

In some embodiments, the historical output data 155*a-n* included in the optimization cache(s) 190*a-n* may be stored for a period of time (e.g., 24 hours), whereafter the historical output data 155*a-n* may be removed from the optimization cache(s) 190*a-n*. In some embodiments, the historical output data 155*a-n* may be stored in association with a counter value representing the frequency with which the historical output data 155*a-n* is retrieved from the optimization cache(s) 190*a-n* and/or an indication of a performance/satisfaction corresponding to the historical output data 155*a-n*, such as an accuracy or a user satisfaction associated with predicted output data 165*a-n* corresponding to the historical output data 155*a-n*. In some embodiments, such as where a query may result in the retrieval of more than one item of historical output data 155*a-n* from an optimization cache(s) 190*a-n*, the optimization cache(s) 190*a-n* may return the historical output data 155*a-n* associated with the higher counter value.

The optimization component(s) 160*a-n* may process the historical output data 155*a-n* to generate the predicted output data 165*a-n*. Example processing of example optimization components is discussed herein in connection with FIGS. 3A-3E. For example, the predicted output data 165*a-n* may include the speculative token data 318, the inference data chunks 328, the responsive output data 338, the responsive output data 348, and/or the action plan data 358, as discussed herein in connection with FIGS. 3A-3E. The predicted output data 165*a-n* may be sent to the optimization orchestrator component 140, which may, in turn, send the predicted output data 165*a-n* to the language model service 125 and, in turn, the application 110.

In some embodiments, such as where the predicted output data 165*a-n* is received by the optimization orchestrator component 140 from more than one of the optimization component(s) 160*a-n*, the optimization orchestrator component 140 may select and send predicted output data 165*a-n* corresponding to a single optimization component(s) 160*a-n* to the language model service 125. In some embodiments, the optimization orchestrator component 140 may select the predicted output data 165*a-n* that corresponds to the historical output data 155*a-n* that is associated with the highest semantic similarity to the natural language input data 117. For example, as discussed herein, the historical output data 155*a-n* may include/be sent along with an indication of the similarity of the historical output data 155*a-n* to the natural language input data 117. The indication of similarity may be sent with/included in the predicted output data 165*a-n* and used by the optimization orchestrator component 140 to select the predicted output data 165*a-n* corresponding to the single optimization component(s) 160*a-n*. In other embodiments, the optimization orchestrator component 140 may select the predicted output data 165*a-n* corresponding to a top-ranked/preferred optimization component(s) 160*a-n*, which may be indicated by the optimization plan data 127, as discussed herein.

The predicted output data 165*a-n* may be sent to the application 110 via the language model service 125, which may process the predicted output data 165*a-n* as described herein to generate the responsive output data 175. In some embodiments, the predicted output data 165*a-n* may include/ be sent along with an indication of the optimization component(s) 160*a-n* that was used to generate the predicted output data 165*a-n*, which may dictate how the application 110 uses the predicted output data 165*a-n* to generate the responsive output data 175 (e.g., based on the optimization strategy/technique applied, as described herein). In some such embodiments, the indication may correspond to an identifier corresponding to the particular strategy/technique applied, an identifier corresponding to the optimization component(s) 160*a-n*, and/or a natural language description of the particular strategy/techniques applied and/or how the application 110 is to use the predicted output data 165*a*0*n* to generate the responsive output data 175. For example, predicted output data 165*a* may include/be sent along with an indication of the optimization component 160*a* that generated the predicted output data 165*a*, which may be configured to implement speculative processing techniques. Based on the indication, the application 110 may determine to send the predicted output data 165*a* to be processed by the language model 120. The application 110 may further send an indication to the language model 120 that it is to implement speculative processing techniques to generate the responsive output data 175 (e.g., process to verify the tokens included I the predicted output data 165*a* at least partially in parallel, as discussed herein). For further example, predicted output data 165*b* may include/be sent along with an indication of the optimization component 160*b* that generated the predicted output data, which may be configured to implement a technique of identifying whether a current input has a deterministic response and returning the corresponding deterministic response. Based on the indication, the application 110 may determine to use the predicted output data 165*b* directly as the responsive output data 175 or otherwise determine the responsive output data 175 based on the predicted output data 165*b* without causing the language model 120 to process.

FIG. 1C illustrates example processing of the system 100 to update one or more of the optimization cache(s) 190*a-n* using the responsive output data 175. In some embodiments, the responsive output data 175 may further include model outputs generated by the language model 120 to generate the responsive output data 175, such as action plans, model outputs associated with various tasks performed by the language model 120, etc. As shown in FIG. 1C, the application 110 may send the responsive output data 175 and feedback data 179 to the language model service 125. The feedback data 179 may include feedback associated with the responsive output data 175. For example, the feedback data 179 may include explicit user-provided feedback, such as feedback indicating the response was/was not satisfactory or indicating a user preference for future responses (e.g., a follow-up response, such as "stop," "that's not what I wanted," or the like). For further example, the feedback may be implicit, such as an indication of a user's emotion/ sentiment. The responsive output data 175 and the feedback data 179 may be sent from the language model service 125 to the optimization orchestrator component 140. In some embodiments, the natural language input data 117 and at least a portion of the context data 119, such as the application ID 118 and/or a user ID may be further sent to the optimization orchestrator component 140 separate from/ included in the responsive output data 175 or the feedback data 179.

In some embodiments, the application 110 may provide the responsive output data 175 and the feedback data 179 to the language model service 125 as part of a directive (e.g., an UPDATE request, such as a component/API call) usable to cause the language model optimization service 130 to update one or more of the optimization cache(s) 190*a-n* based on at least the responsive output data 175 and the feedback data 179. Based on the received directive, the language model service 125 may provide the responsive output data 175 and/or the feedback data 179 to the optimization orchestrator component 140 along with a directive to update the optimization cache(s) 190*a-n* accordingly.

As shown in FIG. 1C, the responsive output data 175 and the feedback data 179 may be received at the optimization orchestrator component 140. In some embodiments, the optimization orchestrator component 140 may be further configured to update the optimization profile storage 170 with optimization metric data 185 representing various performance metrics associated with the processing performed by the optimization component(s) 160*a-n* with respect to inputs associated with the application 110. The optimization orchestrator component 140 may generate the optimization metric data 185 based on the information determined by one or more components of the system 100 (e.g., the responsive output data 175, the feedback data 179, the predicted output data 165*a-n*, the historical output data 155*a-n*, etc.). For example, the optimization metric data 185 may include a latency of the processing performed by the optimization component(s) 160*a-n* (e.g., an amount of time for the optimization component(s) 160*a-n* to generate the predicted output data 165*a-n*, the total amount of time to generate the responsive output data 175, a comparison of the amount of time to generate the responsive output data 175 based on the predicted output data 165*a-n* and the average amount of time for the language model 120 to generate responsive output data without predicted output data). For further example, the optimization metric data 185 may include an accuracy of the processing performed by the optimization component(s) 160*a-n*. The accuracy of the processing performed by the optimization component(s) 160*a-n* may represent whether/how often the predicted output data 165*a-n* was the same as the response generated by the language model 120/application 110. As another example, the optimization metric data 185 may include an accuracy of the optimization cache(s) 190*a-n* from which the historical output data 165*a-n* were retrieved. The accuracy of the optimization cache(s) 190*a-n* may represent the (average) number of tokens included in predicted output data generated by the optimization components 160*a-n* that were also included in the corresponding responsive output data generated by the language model 120/the application 110. As an additional example, the optimization metric data 185 may include a cache hit percentage associated with the optimization cache(s) 190*a-n* from which the historical output data 165*a-n* were retrieved. The cache hit percentage may represent whether/how often the historical output data was retrieved from the optimization cache(s) 190*a-n*. As an even further example, the optimization metric data 185 may include previous natural language input data received from the application 110 and corresponding responsive output data generated by the language model 120/the application 110. Also, the optimization metric data 185 may include a user satisfaction score associated with the processing performed by the optimization component(s) 160*a-n* received from the application 110. The user satisfaction score may represent a user satisfaction with the processing performed by the optimization component(s) 160*a-n*.

In some embodiments, the optimization orchestrator component 140 may retrieve previous optimization metric data representing previous performance metrics associated with the optimization component(s) 160*a-n* (e.g., average performance metrics). The optimization orchestrator component 140 may generate the optimization metric data 185 to (further) include an average of the metrics of the previous optimization metric data and the metrics associated with the processing performed by the optimization component(s) 160*a-n* to generate the predicted output data 165*a-n*.

As shown in FIG. 1C, the optimization orchestrator component 140 may send the responsive output data 175, the feedback data 179, and the optimization metric data 185 to the optimization update component 145. The optimization update component 145 may be configured to determine whether to update the optimization cache(s) 190*a-n* with cache update data 147*a-n*. In some embodiments, the cache update data 147*a-n* may be used to update the optimization cache(s) 190*a-n* by adding additional information to the historical cache(s) 190*a-n*. For example, the cache update data 147*a-n* may include the responsive output data 175, which is to be stored in the optimization cache(s) 190*a-n* as historical output data. In other embodiments, the cache update data 147*a-n* may update the optimization cache(s) 190*a-n* by causing information to be removed from the optimization cache(s) 190*a-n*. For example, the cache update 147*a-n* may include an indication to remove the historical output data 155*a-n* from the optimization caches(s) 190*a-n*.

In some embodiments, the optimization update component 145 may determine to update the optimization cache(s) 190*a-n* associated with the predicted output data 165*a-n*, such as the optimization cache(s) 190*a-n* from which the historical output data 155*a-n* was retrieved, based on the responsive output data 175, the feedback data 179, and/or the optimization metric data 185. In some embodiments, the optimization update component 145 may determine to update the optimization cache(s) 190*a-n* based on one or more rules, which may be set by the application 110 (or a developer of the application 110), such as similarity of the responsive output data 175 and the predicted output data 165*a-n*, a level of performance of the optimization component(s) 160*a-n* (e.g., the optimization metric data 185), and/or a level of satisfaction with the responsive output data 175 (e.g., the feedback data 179).

In some such embodiments, the optimization update component 145 may update the optimization cache(s) 190*a-n* by storing the responsive output data 175 in the optimization cache(s) 190*a-n*. For example, the optimization update component 145 may determine to update the optimization cache(s) 190*a-n* with cache update data 147*a-n* corresponding to the responsive output data 175 based on determining the responsive output data 175 is different than the predicted output data 165*a-n*. If the responsive output data 175 is determined to be different from the predicted output data 165*a-n*, it may indicate that the predicted output data 165*a-n* was at least partially incorrect. Therefore, the optimization update component 145 may send cache update data 147*a-n* corresponding to the responsive output data 175 (and the natural language input data 117 and, optionally, the context data 119) to the optimization cache(s) 190*a-n* from which the historical output data 155*a-n* corresponding to the predicted output data 165*a-n* was retrieved so that the responsive output data 175 will be retrieved as historical output data from the optimization cache(s) 190*a-n* in response to receiving natural language input data similar to the natural language input data 117. For further example, the optimization update component 145 may, additionally or alternatively, determine to update the optimization cache(s) 190*a-n* with cache update data 147*a-n* corresponding to the responsive output data 175 based on determining the feedback data 179 indicates that the user 405 is satisfied with the responsive output data 175, and the responsive output data 175 is different than the predicted output data 165*a-n*. In some embodiments, if the feedback data 179 indicates that the user 405 is not satisfied with the responsive output data 175, and the responsive output data 175 is different than the predicted output data 165*a-n*, then the optimization update component 145 may not update the optimization cache(s) 190*a-n*.

In some such embodiments, the optimization update component 145 may, additionally or alternatively, update the optimization cache(s) 190*a-n* by removing the historical output data 155*a-n* corresponding to the predicted output data 165*a-n* from the optimization cache(s) 190*a-n*. For example, the optimization update component 145 may determine to remove the historical output data 155*a-n* corresponding to the predicted output data 165*a-n* from the optimization cache(s) 190*a-n* based on determining the feedback data 179 indicates that the user 405 is not satisfied with the responsive output data 175, and the responsive output data 175 is the same as the predicted output data 165*a-n*. As another example, the optimization update component 145 may, additionally or alternatively, determine to update the optimization cache(s) 190*a-n* with cache update data 147*a-n* corresponding to the responsive output data 175 based on the optimization metric data 185. If a number of the tokens of the predicted output data 165*a-n* that were included in the responsive output data 175 (e.g., the number of verified tokens), as indicated in the optimization metric data 185, fails to meet/exceed a threshold number of tokens, the optimization update component 145 may send cache update data 147*a-n* to the optimization cache(s) 190*a-n* that cause the optimization cache(s) 190*a-n* to remove the historical output data 155*a-n* corresponding to the predicted output data 165*a-n* from the optimization cache(s) 190*a-n*.

In some such embodiments, the optimization update component 145 may, additionally or alternatively, update the optimization cache(s) 190*a-n* by incrementing/reducing a counter value associated with the historical output data 155*a-n* corresponding to the predicted output data 165*a-n* in the optimization cache(s) 190*a-n*. The counter value associated with historical output data may indicate a determined accuracy/preference of the historical output data. In some embodiments, such as where a query associated with natural language input data may potentially result in retrieval of more than one item of historical output data from an optimization cache, historical output data associated with a higher counter may be retrieved from the optimization cache instead of historical output data associated with a lower counter. The optimization update component 145 may determine to reduce a counter value associated with the historical output data 155*a-n* corresponding to the predicted output data 165*a-n* in the optimization cache(s) 190*a-n* based on determining the responsive output data 175 is different than the predicted output data 165*a-n*. In contrast, the optimization update component 145 may determine to increment a counter value associated with the historical output data 155*a-n* corresponding to the predicted output data 165*a-n* in the optimization cache(s) 190*a-n* based on determining the responsive output data 175 was generated by the language model 120 and is the same as the predicted output data 165*a-n*. For further example, the optimization update component 145 may determine to reduce a counter value associated with the historical output data 155*a-n* corresponding to the predicted output data 165*a-n* in the optimization cache(s) 190*a-n* based on determining the feedback data 179 indicates that the user 405 is not satisfied with the responsive output data 175, and the responsive output data 175 is the same as the predicted output data 165*a-n*. In contrast, the optimization update component 145 may determine to increment a counter value associated with the historical output data 155*a-n* corresponding to the predicted output data 165*a-n* in the optimization cache(s) 190*a-n* based on determining the feedback data 179 indicates that the user 405 is satisfied with the responsive output data 175, and the responsive output data 175 is the same as the predicted output data 165*a-n*. As another example, the optimization update component 145 may determine to reduce a counter value associated with the historical output data 155*a-n* corresponding to the predicted output data 165*a-n* in the optimization cache(s) 190*a-n* based on determining a number of the tokens of the predicted output data 165*a-n* that were included in the responsive output data 175 (e.g., the number of verified tokens), as indicated in the optimization metric data 185, fails to meet/exceed a threshold number of tokens.

In some embodiments, the cache update data 147*a-n* may replace the predicted output data 165*a-n* in the memory location of the optimization cache(s) 190*a-n* from which the historical output data 155*a-n* corresponding to the predicted output data 165*a-n* was retrieved. In other embodiments, the cache update data 147*a-n* may be stored along with the predicted output data 165*a-n*. In some such other embodiments, the cache update data 147*a-n* and the predicted output data 165*a-n* may be associated with the counter value discussed herein. The cache update data 147*a-n*/the predicted output data 165*a-n* may be retrieved from the optimization cache(s) 190*a-n* based on their having the highest counter value/being the most semantically similar to the current natural language input data and/or context data. If the cache update data 147*a-n*/the predicted output data 165*a-n* is retrieved from the optimization cache(s) 190*a-n*, the counter value may be incremented by 1.

In some embodiments, the optimization orchestrator component 140 may determine to send cache update data 147*a-n* to one or more other optimization cache(s) 190*a-n*, other than the optimization cache from which the predicted output data associated with the responsive output data 175 was retrieved, based on the responsive output data 175, the feedback data 179, and/or the optimization metric data 185, as discussed in more detail herein in connection with FIGS. 3A-3E. In other words, the optimization update component 145 may determine to update one or more of the optimization cache(s) 190*a-n* regardless of whether the one or more optimization cache(s) 190*a-n* correspond to the optimization cache from which the historical output data 155*a-n* corresponding to the predicted output data 165*a-n* was retrieved. As such, the optimization update component 145 may be configured to update an optimization cache with the responsive output data 175 based on determining that the optimization component(s) 160*a-n* associated with the optimization cache(s) 190*a-n* is the most applicable to natural language input data 117 and/or the responsive output data 175.

Figure 2:
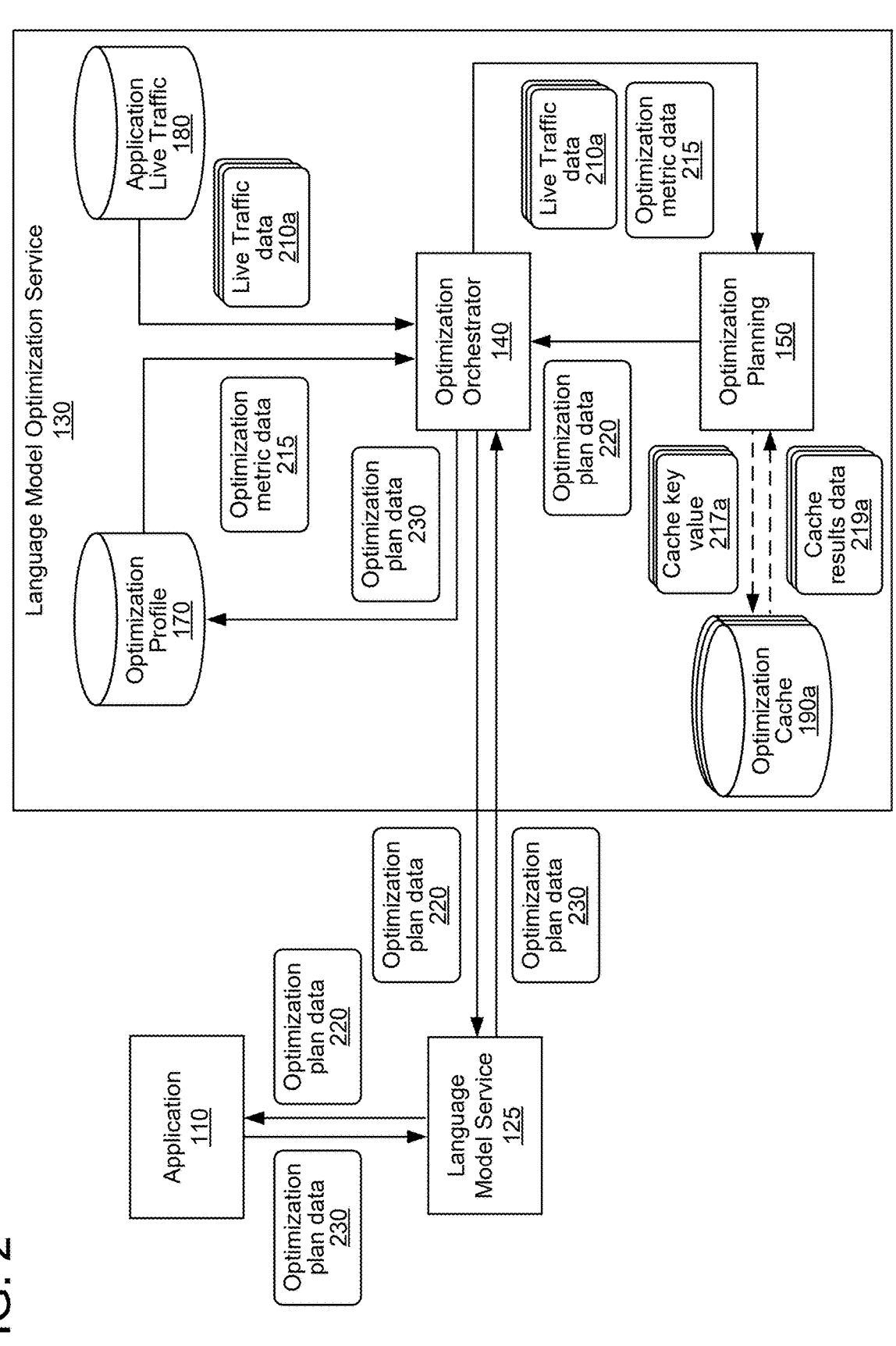
FIG. 2 is a conceptual diagram illustrating example components and processing of the system to determine an optimization component(s) to be recommended to optimize language model processing with respect to the language model-based application, according to embodiments of the present disclosure.

FIG. 2 illustrates example processing of the language model optimization service 130 to determine one or more optimization component(s) 160*a-n* to be recommend to optimize the processing of the language model with respect to the application 110.

As discussed herein, in some embodiments, the language model optimization service 130 may determine the optimization component(s) 160*a-n* to be used to optimize the processing of the application 110 based on the application 110 (or a developer of the application 110) providing an indication of the optimization component(s) 160*a-n* to be used. For example, the language model service 125 may receive optimization plan data 230 from the application 110 indicating the optimization component(s) 160*a-n* to be used. The language model service 125 may send the optimization plan data 230 to the language model optimization service 130, which may store the optimization plan data 230 in the optimization profile storage 170 in association with an application ID 118 corresponding to the application 110.

In some embodiments, the language model optimization service 130 may be configured to recommend the optimization component(s) 160*a-n* to be applied to inputs received from the application 110 based on the type of inputs associated with the application 110 and/or performance metrics associated with the processing already performed by the optimization component(s) 160*a-n* with respect to inputs received from the application 110. For example, as shown in FIG. 2, the language model optimization service 130 may recommend the optimization component(s) 160*a-n* based on live traffic data 210*a-n* and/or optimization metric data 215 associated with the application 110.

As shown in FIG. 2, live traffic data 210*a-n* may be retrieved from the application live traffic storage 180 and sent to the optimization orchestrator component 140. The live traffic data 210*a-n* may be a plurality of inputs received from the application 110 and may indicate a type of input likely to be received from the application 110. In some embodiments, the live traffic data 210*a-n* may be stored in the application live traffic storage 180 as the inputs are received from the application 110. In some embodiments, the live traffic data 210*a-n* may be retrieved using an application ID 118 associated with the application 110.

As shown in FIG. 2, optimization metric data 215 may, additionally or alternatively, be retrieved from the optimization profile storage 170 and sent to the optimization orchestrator component 140. The optimization metric data 215 may represent various performance metrics associated with the processing performed by the optimization component(s) 160*a-n* with respect to inputs received from the application 110, as discussed herein. In some embodiments, the optimization metric data 215 may be retrieved using an application ID 118 associated with the application 110.

The optimization orchestrator component 140 may send the live traffic data 210*a-n* and/or the optimization metric data 215 to the optimization planning component 150. The optimization planning component 150 may be configured to determine one or more of the optimization component(s) 160*a-n* that are best suited (e.g., most likely) to optimize the processing of the language model 120 with respect to inputs received from the application 110. In some embodiments, the optimization planning component 150 may determine an initial set of optimization component(s) 160*a-n* to be recommended based on the inputs received from the application 110. For example, the optimization planning component 150 may process the live traffic data 210*a-n* to determine optimization plan data 220 indicating one or more optimization component(s) 160*a-n* recommended to be applied to the inputs associated with the application 110. The optimization plan data 220 may be sent to the optimization orchestrator component 140, which may, in turn, send the optimization plan data 220 to the language model service 125. The language model service 125 may send the optimization plan data 220 to the application 110. Thereafter, the optimization plan data 230 may be received by the language model service 125, which may be stored in the optimization profile storage as discussed herein. In some embodiments, the optimization plan data 230 may indicate a ranking/preference of the one or more optimization component(s) 160a-n that the application 110 is to be opted into. In some such embodiments, the ranking/preference may be indicated by the application 110 (or a developer of the application 110). In other such embodiments, the ranking/preference may be determined based on the processing of the optimization planning component 150 (e.g., based on the live traffic data 210a-n, the optimization metric data 215, and/or the cache results data 219a-n).

In some embodiments, the optimization planning component 150 may include a ML model configured to determine an applicability of the optimization component(s) 160a-n to the live traffic data 210a-n. An applicability of an optimization component(s) 160a to an instance of live traffic data 210a may represent whether the optimization component(s) 160a is configured to generate predicted output data 165a based on the live traffic data 210a/whether a optimization cache(s) 190a may return historical output data 155a based on a query corresponding to the live traffic data 210a. During training, the ML model may take as input natural language input data and may be tasked with determining an optimization component(s) 160a-n that may be applicable to the natural language input data. The output of the ML model may be compared to a ground-truth label representing an actual optimization component(s) 160a-n that may be applicable to the natural language input data. Based on the comparison, one or more model parameters (e.g., weights) may be updated accordingly (e.g., via backpropagation).

The ML model may process the live traffic data 210a-n to determine outputs indicating optimization component(s) 160a-n applicable to the live traffic data 210a-n. Based on the outputs, the optimization planning component 150 may generate the optimization plan data 220. For example, the optimization plan data 220 may indicate the optimization component(s) 160a-n determined to be applicable to a threshold amount of the live traffic data 210a-n. In some embodiments, the optimization plan data 220 may further indicate a ranking/preference of the optimization component(s) 160a-n, which may correspond to the amount of the live traffic data 210a-n that the optimization component(s) 160a-n are deemed applicable to.

In some embodiments, after applying the optimization component(s) 160a-n to inputs associated with the application 110, the optimization planning component 150 may be configured to recommend a modified set of optimization component(s) 160a-n to be used to optimize the processing of the application 110. In some such embodiments, the optimization planning component 150 may process the live traffic data 210a-n as discussed herein to generate the optimization plan data 220 indicating the recommended modified set of optimization component(s) 160a-n. In some embodiments, the optimization plan data 220 may further indicate a ranking/preference of the optimization component(s) 160a-n, which may correspond to the amount of the live traffic data 210a-n that the optimization component(s) 160a-n are deemed applicable to.

In other such embodiments, the optimization planning component 150 may, additionally or alternatively, process the optimization metric data 215 to generate the optimization plan data 230. For example, the optimization planning component 150 may determine whether the optimization metric data 215 indicates that a performance (e.g., latency, accuracy, cache hit accuracy, user satisfaction, etc.) of the optimization component(s) 160a-n meet/exceed a threshold performance. If the optimization metric data 215 indicates that the performance of the optimization component(s) 160a-n meet/exceed a threshold performance, the corresponding optimization component(s) 160a-n may be included in the optimization plan data 220. In some embodiments, the optimization plan data 220 may further indicate a ranking/preference of the optimization component(s) 160a-n, which may correspond to the performance of the optimization component(s) 160a-n.

In other such embodiments, the optimization planning component 150 may, additionally or alternatively, use the optimization cache(s) 190a-n corresponding to the optimization components 160a-n to generate the optimization plan data 220. For example, as shown in FIG. 2, the optimization planning component 150 may be configured to query the optimization cache(s) 190a-n using cache key values 217a-n corresponding to the live traffic data 210a-n and, in response, may receive cache results data 219a-n indicating whether the live traffic data 210a-n is similar to historical output data stored in the corresponding optimization cache(s) 190a-n. If cache results data 219a retrieved/returned by a optimization cache(s) 190a indicates that a cache hit occurred, (e.g., historical output data stored in the optimization cache(s) 190a is returned in response to the query) the optimization planning component 150 may determine that an optimization component(s) 160a associated with the optimization cache(s) 190a may be applicable to the live traffic data 210a associated with the query. If cache results data 219b retrieved/returned by a optimization cache(s) 190b indicates that a cache miss occurred, (e.g., no historical output data is returned in response to the query) the optimization planning component 150 may determine that an optimization component(s) 160b associated with the optimization cache(s) 190b may not be applicable to live traffic data 210b associated with the query.

Based on the cache results data 219a-n, the optimization planning component 150 may generate the optimization plan data 220. For example, the optimization plan data 230 may indicate the optimization component(s) 160a-n determined to be applicable to a threshold amount of the live traffic data 210a-n. In some embodiments, based on the processing described herein to determine the optimization component(s) 160a-n applicable to the live traffic data 210a-n, the live traffic data 210a-n may be sent to the optimization cache(s) 190a-n associated with the optimization component(s) 160a-n. In some embodiments, the optimization plan data 220 may further indicate a ranking/preference of the optimization component(s) 160a-n, which may correspond to the amount of the live traffic data 210a-n that the optimization component(s) 160a-n are deemed applicable to.

In some embodiments, the language model optimization service 130 may cause the optimization planning component 150 to process as described herein when an application 110 registers/subscribes to the services of the language model optimization service 130, as described herein to generate the initial set of optimization component(s) 160a-n. In some such embodiments, the application 110 may be configured to send live traffic (e.g., inputs) to the language model optimization service 130 to be stored in the application live traffic storage 180. In some embodiments, the language model optimization service 130 may cause the optimization planning component 150 to process as described herein periodically (e.g., weekly, monthly, quarterly, yearly, etc.) to generate the modified set of optimization component(s) 160*a-n*. In some embodiments, the language model optimization service 130 may cause the optimization planning component 150 to generate and recommend a modified set optimization component(s) 160*a-n* based on a request received from the application 110 (or a developer associated with the application 110).

FIGS. 3A-3E are conceptual diagrams illustrating example optimization components configured to optimize language model processing with respect to a language model-based application according to different optimization strategies/techniques. In particular, FIGS. 3A-3E illustrates an example optimization component(s) 160*a* configured to determine speculative tokens, an example optimization component(s) 160*b* configured to determine inference data chunks, an example optimization component(s) 160*c* configured to determine a direct response to a user input without use of a language model, an example optimization component(s) 160*d* configured to use a smaller, more efficient language model(s) to generate a response to a user input, instead of the language model 120, and an example optimization component(s) 160*e* configured to determine action plans to be stored on/used by the user device 410 for processing a user input.

Figure 3C:
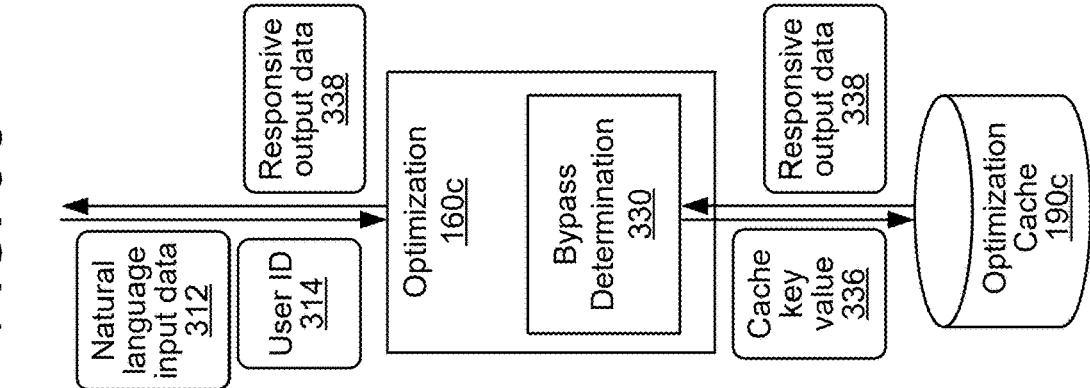
FIGS. 3A-3E are conceptual diagrams illustrating example optimization components configured to optimize language model processing with respect to a language model-based application, according to embodiments of the present disclosure.
Figure 3B:
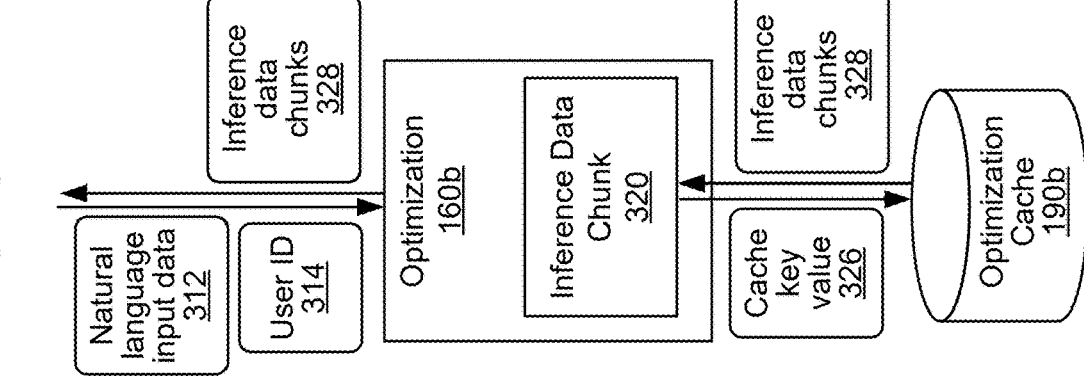
Figure 3A:
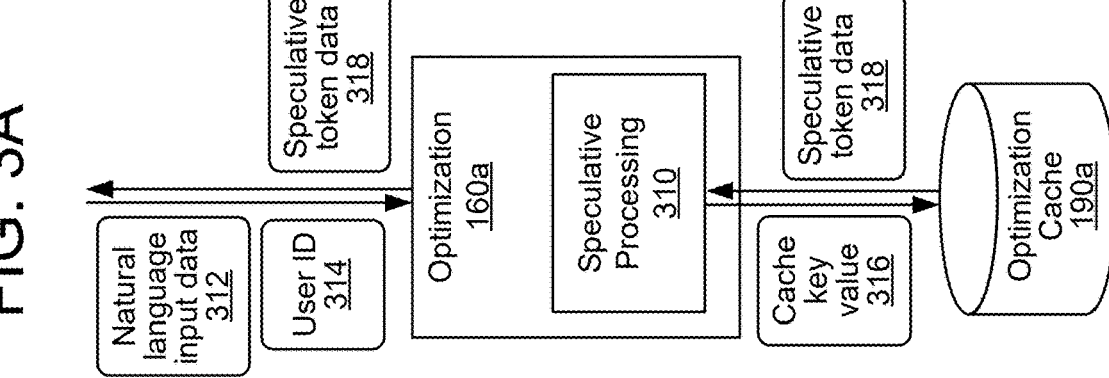

With respect to FIG. 3A, the optimization component 160*a* may be configured to implement speculative decoding techniques, where multiple speculative tokens determined by the optimization component(s) 160*a* as potentially responsive to an input are verified by a language model (e.g., the language model 120) during a single time step. The verification process by the language model 120 can be more efficient (e.g., in terms of computational resources, time, etc.) than the generation process by the language model 120, and the generation of the speculative tokens can be more efficient (e.g., in terms of computation resources, time, etc.) than the generation process by the language model 120. As such, using speculative decoding, latency in a language model generating data/tokens can be decreased. Using speculative decoding, the system 100 can generate multiple tokens in a single timestep/iteration, rather than generating a single token in a single timestep when speculative decoding is not used.

As shown in FIG. 3A, natural language input data 312 and user ID 314 may be received at a speculative processing component 310 of the optimization component(s) 160*a*. In some embodiments, the user ID 314 may be included in context data associated with the natural language input data 312, such as the context data 119. The speculative processing component 310 may be configured to determine speculative tokens (e.g., the speculative token data 318) potentially responsive to the natural language input data 312 and to be verified by the language model 120. Speculative tokens can be characters, words, punctuations, etc., that are determined by the speculative processing component 310 as being potentially responsive to the natural language input data 312. In some embodiments, the speculative token data 318 may correspond to responsive output data generated by the language model 120 based on processing natural language input data that is similar to the natural language input data 312.

The speculative processing component 310 may query the optimization cache(s) 190*a* associated with the optimization component(s) 160*a* using a cache key value 316 corresponding to the natural language input data 312 and the user ID 314 for the speculative token data 318. The optimization cache(s) 190*a* may include a plurality of speculative tokens corresponding to historical (e.g., previous) responsive output data generated by the language model 120. In some embodiments, speculative tokens/responsive output data may be stored in the optimization cache(s) 190*a* based on determining, by the optimization update component 145/the optimization planning component 150, the speculative tokens/responsive output data was generated by the language model 120 as responsive to an input associated with the application 110. In other embodiments, speculative tokens/responsive output data may be stored in the optimization cache(s) 190*a* based on determining, by the optimization update component 145/the optimization planning component 150, the speculative tokens/responsive output data was generated by the language model 120 as responsive to an input associated with the application 110 and was different from speculative tokens retrieved from the optimization cache(s) 190*a* as potentially responsive to the input. In further embodiments, the speculative tokens/responsive output data may be stored in the optimization cache(s) 190*a* based on a determination of the ML model discussed herein above in connection with the optimization planning component 150.

The speculative token data 318 may be included in/corresponding to the predicted output data 165*a-n* and may be sent to the optimization orchestrator component 140, which may, in turn, send the speculative token data 318 to the language model service 125. The speculative token data 318, the natural language input data 312, and, optionally, the user ID 314 are sent to the language model 120 via application 110.

The language model 120 may process the natural language input data 312 and the speculative token data 318 to verify the speculative token data 318 in parallel (e.g., in a single timestep, such as a single pass through the verification language model). For example, during a first timestep, the language model 120 may perform one or more (e.g., corresponding to the number of speculative tokens in speculative token data 318) operations in parallel to generate predicted tokens based on the speculative token data 318. At each of the parallel operations, the language model 120 generates a predicted token usable to verify the corresponding speculative token, where the predicted token is generated based on the previous speculative token(s). For example, during a first parallel operation of the language model 120, the language model 120 generates a first predicted token usable to verify the first speculative token; at a second parallel operation, the language model 120 generates, using the first speculative token as a prior token, a second predicted token usable to verify the second speculative token; at a third parallel operation, the language model 120 generates, using the first and second speculative tokens as prior tokens, a third predicted token usable to verify the second speculative token; and so on.

The language model 120 may compare the predicted tokens to the speculative token data 318 to determine a response to the natural language input data 312. If a predicted token matches a corresponding speculative token (e.g., if a kth predicted token matches a kth speculative token), the speculative token may be considered as verified and may be included in a set of tokens output by the language model 120. If instead, a predicted token and the corresponding speculative token do not match, a bifurcation occurs, and the predicted token may be included in the response output by the verification language model instead of the corresponding (rejected) speculative token. The processing of the language model 120 to verify the speculative token data 318 may continue until all of the speculative token data 318 have been verified or a bifurcation occurs.

If the last predicted token generated by the language model 120 indicates that the processing of the language model 120 to generate the response to the natural language input data 117 is complete (e.g., if the last predicted token is a [EndOfSequence] ([EOS]) token), then the language model 120 may output the result of the verification process as the response to the natural language input data 312. If the last predicted token generated by the language model 120 indicates that the processing of the language model 120 to generate the response to the natural language input data 117 is not complete, then the language model 120 may perform autoregressive decoding of the natural language input data 312 and the result of the verification process to generate the final responsive output data.

With respect to FIG. 3B, the optimization component 160b may be configured to determine inference data chunks corresponding to language model outputs generated as a result of processing a previous user input data determined to be similar to the current user input. Example language model outputs may include, as discussed herein in connection with FIG. 4-5, a model output generated as a result of task generation processing task, a model output generated as a result of language model shortlisting processing task, and/or a model output generated as a result of response arbitration processing task.

As shown in FIG. 3B, the natural language input data 312 and the user ID 314 may be sent to the inference data chunk component 320. The inference data chunk component 320 may be configured to determine inference data chunks (e.g., the inference data chunks 328) usable by the language model 120 to perform processing of one or more task to generate a response to the natural language input data 312 in parallel, as discussed herein.

The inference data chunk component 320 may query the optimization cache(s) 190b associated with the optimization component(s) 160b using a cache key value 326 corresponding to the natural language input data 312 and, optionally, the user ID 314 for the inference data chunks 328. The optimization cache(s) 190b may include a plurality of inference data chunks representing model outputs generated by the language model 120 (or one or more language models, including the language model 120) according to one or more tasks in order to generate a response to a user input.

In some embodiments, inference data chunks may be included in responsive output data received from the language model 120 via the application 110 and may be stored in the optimization cache(s) 190b based on determining, by the optimization update component 145/the optimization planning component 150, the responsive output data/inference data chunks was/were generated by the language model 120 based on an input associated with the application 110. In other embodiments, inference data chunks may be stored in the optimization cache(s) 190b based on determining, by the optimization update component 145/the optimization planning component 150, the responsive output data/inference data chunks was/were generated by the language model 120 based on an input associated with the application 110 and the inference data chunks were different from the inference data chunks retrieved from the optimization cache(s) 190b. In further embodiments, inference data chunks may be stored in the optimization cache(s) 190b based on a determination of the ML model discussed herein above in connection with the optimization planning component 150.

The inference data chunks 328 may be included in/corresponding to the predicted output data 165a-n and may be sent to the optimization orchestrator component 140, which may, in turn, send the inference data chunks 328 to the language model service 125. The inference data chunks 328, the natural language input data 312, and, optionally, the user ID 314 and the device context data 352 are sent to the language model 120 via the application 110.

The language model 120 may use each portion of the inference data chunks 328 to perform the corresponding tasks in parallel. For example, while processing the natural language input data 312 to perform a task generation processing task, the language model 120 may use the portion of the inference data chunks 328 corresponding to the previous task generation processing task to perform a language model shortlisting processing task. As another example, while performing the task generation processing task and/or the language model shortlisting processing task, the language model 120 may use a portion of the inference data chunks 328 corresponding to a previous language model shortlisting processing task to perform a response arbitration task.

During processing corresponding to a particular upstream task/once processing of the particular upstream task is complete, the language model 120 may verify the portion (e.g., data chunk) of the inference data chunks 328 corresponding to the particular upstream task (e.g., similar to the verification process described herein) and may update the processing of any corresponding downstream task accordingly. For example, based on generating (a portion of) a model output for the task generation processing task, the language model 120 may compare the (portion of the) model output to the portion of the inference data chunks 328 corresponding to the previous task generation processing task (which was used by the language model 120 for the language model shortlisting task). If a bifurcation occurs between the (portion of the) model output and the corresponding portion of the speculative token data 318, the language model 120 may use the model output to reperform the language model shortlisting task (and, optionally, any other downstream task). The language model 120 may process as described herein to generate responsive output data, which may be sent to the application 110 for output/presentation.

With respect to FIG. 3C, the optimization component 160c may be configured to determine responsive output data (e.g., the responsive output data 338) that is to be sent directly to the application 110, thereby bypassing the processing of the language model 120. As shown in FIG. 3C, the natural language input data 312 and the user ID 314 may be sent to the bypass determination component 330. The bypass determination component 330 may be configured to determine the responsive output data 338 responsive to the natural language input data 312. In some embodiments, the responsive output data 338 may correspond to historical (e.g., previous) responsive output data responsive to natural language input data that is similar to the natural language input data 312 and determined by the language model optimization service 130 to be deterministic.

The bypass determination component 330 may query the optimization cache(s) 190c associated with the optimization component(s) 160c using a cache key value 336 corresponding to the natural language input data 312 and, optionally, the user ID 314 for the responsive output data 338. The optimization cache(s) 190c may include a plurality of natural language input data and corresponding responsive output data that are determined to be deterministic. Natural language input data and responsive output data may be considered deterministic if the responsive output data is likely to always be responsive to the natural language input data (or similar natural language input data). For example, a response of "turning on the lights" may be a satisfactory, deterministic response to the user input of "please turn on the lights," whereas a response to a user input of "What is the weather" may not be deterministic due to the frequency with which the weather changes, therefore a single/similar response may not always be responsive to the user input.

In some embodiments, deterministic natural language input data and corresponding responsive output data may be stored in the optimization cache(s) 190c based on determining, by the optimization update component 145/the optimization planning component 150, the responsive output data (or similar responsive output data) has been received from the application 110 for the natural language input data (or similar responsive output data) with a particular frequency (e.g., 5 times in a week), which may be indicated in optimization metric data associated with the application 110. In some embodiments, the natural language input data and corresponding responsive output data may be stored in the optimization cache(s) 190c (further) based on determining feedback data associated with the responsive output data indicates a user satisfaction. In other embodiments, the speculative tokens/responsive output data may be stored in the optimization cache(s) 190a based on a determination of the ML model discussed herein above in connection with the optimization planning component 150. For example, the ML model may be trained used positive and, optionally, negative examples of deterministic natural language input data and responsive output data, such that the ML model may be configured to identify whether natural language input data and corresponding responsive output data is deterministic.

The responsive output data 338 may be included in/corresponding to the predicted output data 165a-n and may be sent to the optimization orchestrator component 140, which may, in turn, send the responsive output data 338 to the language model service 125. The responsive output data 338 may be directly used by the application 110 as the response to the natural language input data 312.

Figure 3E:
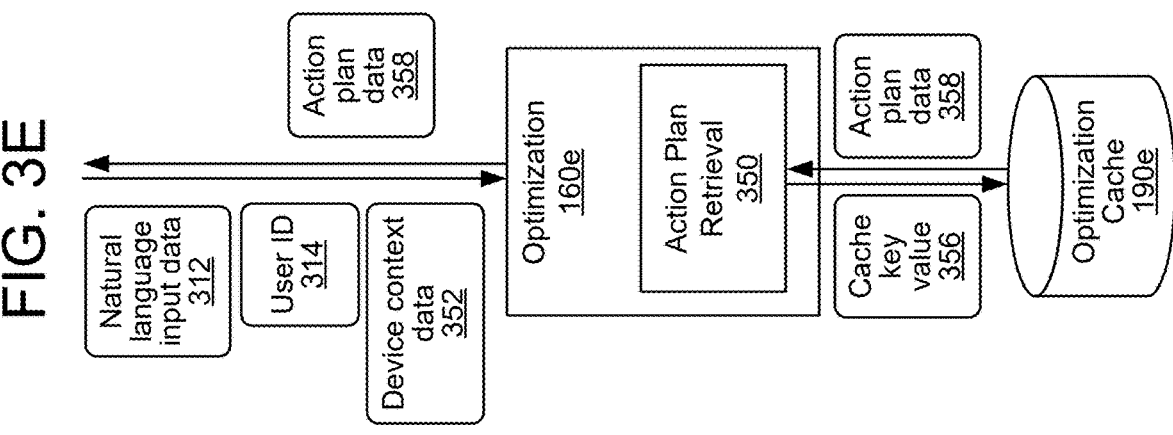
Figure 3D:
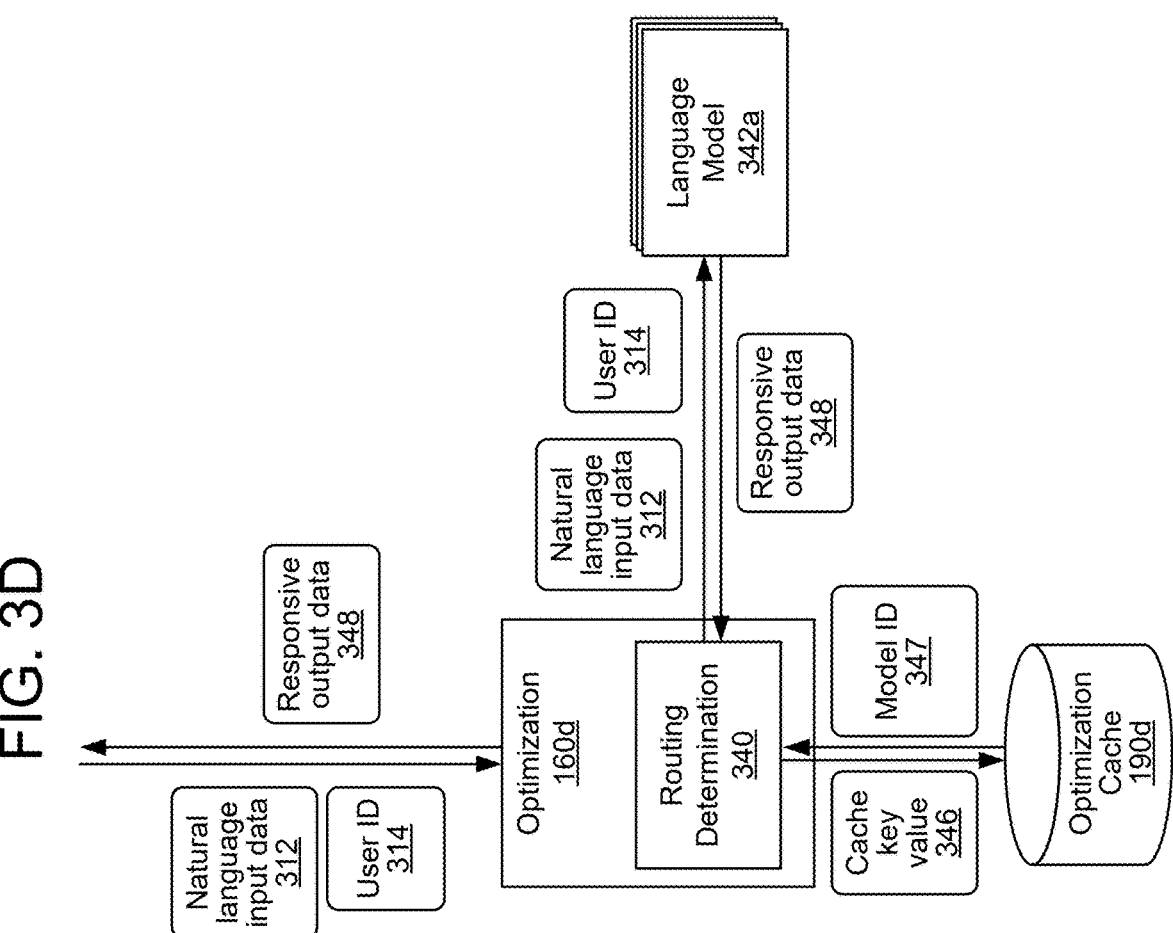

With respect to FIG. 3D, the optimization component 160d may be configured to determine a smaller, more efficient language model to generate the responsive output data (e.g., the responsive output data 348) instead of the language model 120. As shown in FIG. 3D, the natural language input data 312 and the user ID 314 may be sent to the routing determination component 340. The routing determination component 340 may be configured to determine a language model 342a-n that may be configured to generate responsive output data responsive to the natural language input data 312 more efficiently (e.g., with less latency) than the language model 120, but while maintaining a similar accuracy. In some embodiments, the language model 342a-n may be finetuned for a category/task associated with the natural language input data 312

The routing determination component 340 may query the optimization cache(s) 190d associated with the optimization component(s) 160d using a cache key value 346 corresponding to the natural language input data 312 and, optionally, the user ID 314 for a model ID 347 corresponding to the language model 342a-n that is configured to process inputs corresponding to the natural language input data 312. The optimization cache(s) 190d may include a plurality of natural language inputs, corresponding responsive output data, and a model ID corresponding to a language model 342a-n configured to process the natural language input data to generate the responsive output data. In some embodiments, the model ID 347 may correspond to a category/task corresponding to the natural language input data 312 (e.g., shopping, music, movies, code generation, question and answer, content summarization, etc.) from the optimization cache(s) 190d, which may be usable by the routing determination component 340 to determine the language model 342a-n configured to process inputs corresponding to that category/task.

In some embodiments, natural language input data and corresponding responsive output data may be stored in the optimization cache(s) 190d based on determining, by the optimization update component 145/the optimization planning component 150, that the natural language input data and/or responsive output data are semantically similar to natural language input data and corresponding responsive output data included in the optimization cache(s) 190d. In other embodiments, natural language input data and corresponding responsive output data may be stored in the optimization cache(s) 190d based on a determination of the ML model discussed herein above in connection with the optimization planning component 150. For example, the ML model may be trained used positive and, optionally, negative examples of natural language input data and responsive output data that correspond to a category(ies)/task(s) that the language model 342a-n are configured for, such that the ML model may be configured to identify whether natural language input data and corresponding responsive output data correspond to such a category(ies)/task(s).

The routing determination component 340 may send the natural language input data 312 and, optionally, the user ID 314, to the corresponding language model 342a-n, which may process similar to the language model 120 to generate and return responsive output data 348. The responsive output data 348 may be included in/corresponding to the predicted output data 165a-n and may be sent to the optimization orchestrator component 140, which may, in turn, send the responsive output data 348 to the language model service 125. The responsive output data 348 may be directly used by the application 110 as the response to the natural language input data 312.

With respect to FIG. 3E, the optimization component 160e may be configured to determine an action plan including directive(s) for component(s) to provide potential responses to a natural language input, which may be usable by a user device 410 local to a user 405 associated with the natural language input to generate a response to the natural language input. As shown in FIG. 3E, the natural language input data 312, the user ID 314, and device context data 352 may be sent to the action plan retrieval component 350. The device context data 352 may include various information associated with a user device 410 that received the natural language input data 312, such as a device ID, an indication of device processing capabilities, an indication of the last time the user device 410 was online (e.g., powered on and connected to the Internet), etc. The action plan retrieval component 350 may be configured to determine action plan data 358 corresponding to an action plan including directive(s) for component(s) to provide potential responses to the natural language input data 312.

The action plan retrieval component 350 may query the optimization cache(s) 190e associated with the optimization component(s) 160e using a cache key value 356 corresponding to the natural language input data 312 and, optionally, the user ID 314 and the device context data 352 for the action plan data 358. The optimization cache(s) 190e may include a plurality of action plan data generated by the language model 120 to generate historical (e.g., previous)

responsive output data. In some embodiments, action plan data may be stored in the optimization cache(s) 190*e* based on determining, by the optimization update component 145/the optimization planning component 150, the action plan data was generated by the language model 120 based on an input associated with the application 110. In other embodiments, action plan data may be stored in the optimization cache(s) 190*e* based on determining, by the optimization update component 145/the optimization planning component 150, the action plan data was generated by the language model 120 as responsive to an input associated with the application 110 and was different from action plan data retrieved from the optimization cache(s) 190*e* as potentially responsive to the input. In further embodiments, the action plan data may be stored in the optimization cache(s) 190*e* based on a determination of the ML model discussed herein above in connection with the optimization planning component 150.

The action plan data 358 may be included in/corresponding to the predicted output data 165*a-n* and may be sent to the optimization orchestrator component 140, which may, in turn, send the responsive output data 348 to the language model service 125. The language model service 125 may send the action plan data 358 directly to the application 110.

As discussed herein, the action plan data 358 may be usable by a user device 410 local to a user 405 associated with the natural language input data 312 to generate a response to the natural language input data 312. As such, the action plan data 358 may be sent to the user device 410 to generate the response to the natural language input data 312. In some embodiments, the application 110 may send the action plan data 358 to the user device 410. In other embodiments, the application 110 may represent the user device 410, where the natural language input data 312 may be received directly from the user device 410.

As discussed above, in some embodiments, the optimization cache(s) 190*a-n* may include personalized caches that include information associated with a particular user and global caches that are associated with a global set of users. As such, in some such embodiments, the components of the optimization component(s) 160*a-n* (e.g., the speculative processing component 310, the inference data chunk component 320, the bypass determination component 330, the routing determination component 340, and, optionally, the action plan retrieval component 350) may be configured to use the cache key values to query for their corresponding information from their corresponding optimization caches that are associated with the user 405 corresponding to the user ID 314. If a cache miss occurs, then the components may use the cache key values (or a new cache key value corresponding to at least the natural language input data 312) to query for their corresponding information from their corresponding global, optimization caches.

In some embodiments, as discussed above, the global, optimization caches may include a portion of the information to be retrieved, but may not include a portion of the information that is personalized to a particular user 405, which may be instead stored in the corresponding optimization cache. The information stored in the global, optimization caches may instead include an indication of a slot to be filled by the personalized information. In some such embodiments, the components of the optimization component(s) 160*a-n* may be configured to query both their corresponding global, optimization cache and their corresponding optimization cache associated with the user corresponding to the user ID 314. Thereafter, the components may fill in the slot indicated by the information retrieved from the global, optimization cache with the information retrieved from the personalized, optimization cache.

In some embodiments, the language model optimization service 130 may be configured to operate in an experimentation mode, where the predicted output data 165*a-n* generated by the optimization component(s) 160*a-n* is not sent to the language model 120, but the responsive output data 175 generated by the language model 120 based on the natural language input data 117 and, optionally, the context data 119 is sent to the language model optimization service 130 to perform one or more of the operations discussed herein without the application 110/language model 120 using the predicted output data generated by the language model optimization service 130. For example, inputs received from the application 110 may be used by the optimization component(s) 160*a-n* to generate predicted output data and compared to the corresponding responsive output data received from the application 110/language model 120 to determine optimization metric data and/or update the optimization cache(s) 190*a-n*, as described herein. For further example, inputs received from the application 110 may be stored in the application live traffic storage 180 and used by the optimization planning component 150 as described herein.

In some such embodiments, the experimentation mode may allow an application to view the performance of one or more of the optimization component(s) 160*a-n* opted into by the application 110/recommended by the language model optimization service 130 without the predicted output data generated by the optimization component(s) 160*a-n* effecting the processing of the application 110/language model 120.

Figure 4:
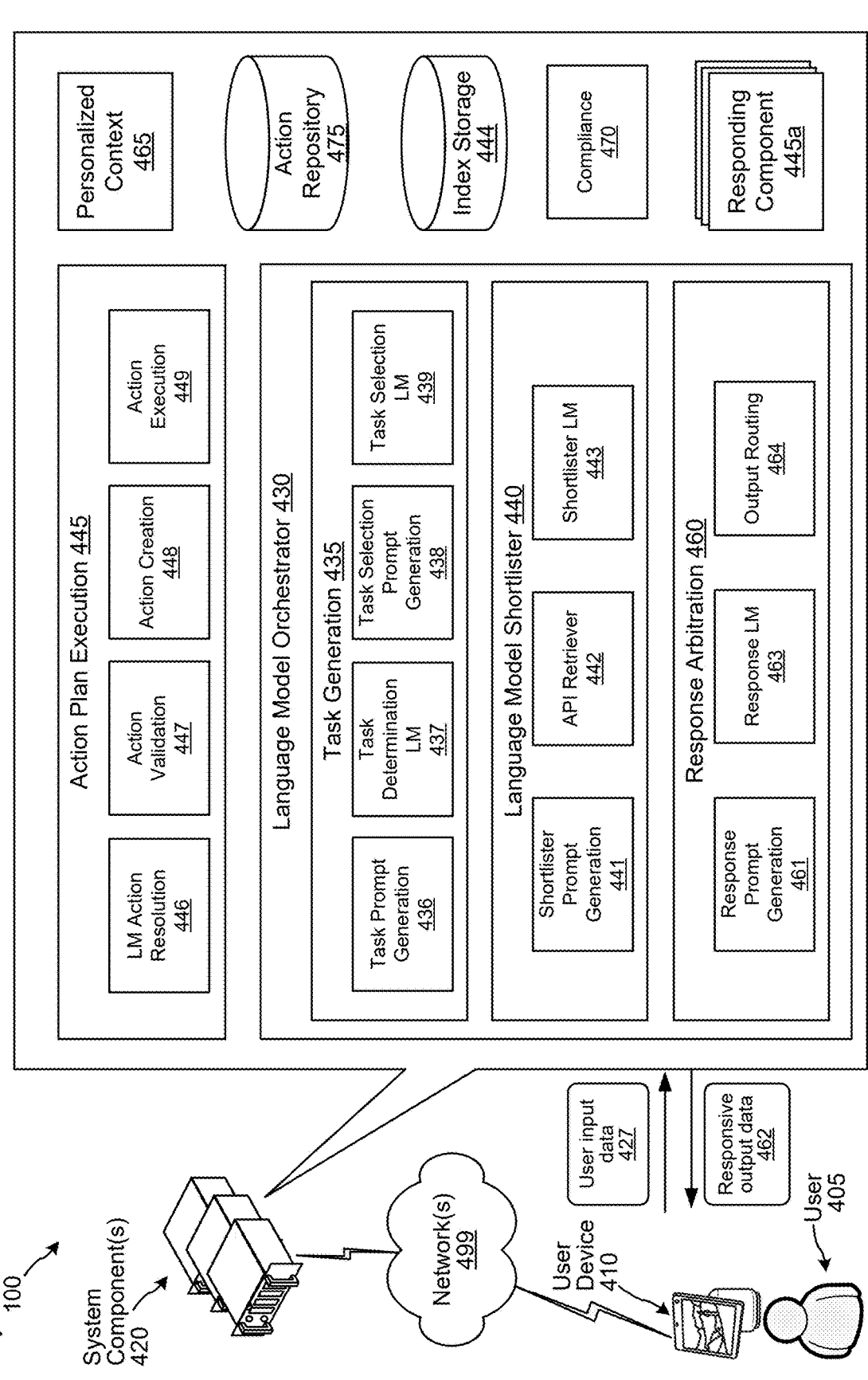
FIG. 4 is a conceptual diagram illustrating example components and processing of a system configured to use a language model(s) to determine a response to a natural language user input, according to embodiments of the present disclosure.

FIG. 4 illustrates further example components included in the system 100 configured to determine an action responsive to a user input using a language model-based approach. As shown in FIG. 4, the system 100 may include a user device 410, local to a user 405, in communication with a system component(s) 420 via a network(s) 499. The network(s) 499 may include the Internet and/or any other wide- or local-area network, and may include wired, wireless, and/or cellular network hardware.

The system component(s) 420 may include various components, such as a language model orchestrator component 430, a personalized context component 465, an action plan execution component 445, an index storage 444, an action repository 475, one or more responding component(s) 445*a-n*, and a compliance component 470. In some embodiments, the compliance component 470 may be included in the language model orchestrator component 430. The action plan execution component 445 may be configured to generate and execute commands for a component(s) configured to perform an action related to a user input to generate information potentially responsive to the user input and may include a language model action resolution component 446, an action validation component 447, an action creation component 448, and an action execution component 449. The compliance component 470 may be configured to determine whether an output of a language model of the system 100 is appropriate for output to the user 405 and/or whether an input to a language model (e.g., a user request, an output of another component of the system 100) will result in a language model generating an output that is appropriate for output to the user 405. The language model orchestrator component 430 may be configured to orchestrate processing to cause a language model(s) to generate a response to a user input and may include a task generation component 435, a language model shortlister component 440, and a response arbitration component 460. In some embodiments, the language model orchestrator component 430 may correspond to the language model orchestrator component 115 discussed herein. The task generation component 435 may be configured to generate a list of tasks (e.g., steps/actions) that are to be completed in order to perform an action responsive to a user input and select a task from the list that is to be completed first, and may include a task prompt generation component 436, a task determination language model 437, a task selection prompt generation component 438, and a task selection language model 439. The language model shortlister component 440 may be configured to determine a directive(s) for a component(s) to perform an action related to a user input and/or a current task, which may be provided to the action plan execution component 445 to generate and execute the abovementioned command(s), and may include a shortlister prompt generation component 441, an API retriever component 442, and a shortlister language model 443. The response arbitration component 460 may be configured to determine whether information returned by the component(s) are responsive to the user input and generate a response to the user input using the responsive information, and may include a response prompt generation component 461, a response language model 463, and an output routing component 464.

As shown in FIG. 4, the system component(s) 420 receive user input data 427, which may be processed by one or more of the various components as described herein to determine responsive output data 462.

As discussed herein, the language model orchestrator component 430 may be configured to orchestrate processing to cause a language model(s) to generate a response to a user input. In some embodiments, the language model orchestrator component 430 may be configured to orchestrate processing to cause a single language model to process as described herein to generate a response to a user input, where the processing described with respect to the task generation component 435, the language model shortlister component 440, and the response arbitration component 460 may represent different stages of processing by the same language model, but with respect to different tasks (e.g., task generation, directive generation, and response generation). For example, during the first stage of processing of the language model, the language model may be tasked with performing task generation to generate a list of tasks to be performed in order to generate a response to a user input and/or perform an action responsive to the user input; during a second stage of processing, based on the list of tasks, the language model may be tasked with performing directive generation to generate a directive(s) for a component(s) to perform an action(s) related to the tasks/user input; and during a third stage of processing, based on information received form the component(s), the language model may be tasked with generating a response to the user input and/or causing the component(s) to perform the action(s).

In other embodiments, the language model orchestrator component 430 may be configured to orchestrate processing to cause multiple language models to process as described herein to generate a response to a user input, where the processing described with respect to the task generation component 435, the language model shortlister component 440, and the response arbitration component 460 may be performed by different language models configured for the corresponding task(s).

As shown in FIG. 5, the system component(s) 420 may receive user input data 427, which may be provided to the language model orchestrator component 430. As also shown in FIG. 5, the system component(s) 420 may receive the predicted output data 165a-n, which may be received from the language model service 125, as discussed herein. In some instances, the user input data 427 may correspond to the natural language input data 117. In some instances, the user input data 427 may correspond to various data types, such as text (e.g., a text or tokenized representation of a user input), audio, image, video, etc. For example, the user input data may include input text (or tokenized) data when the user input is a typed natural language user input. For further example, prior to the language model orchestrator component 430 receiving the user input data 427, another component (e.g., an automatic speech recognition (ASR) component 650) of the system 100 may receive audio data representing the user input. The ASR component 650 may perform ASR processing on the audio data to determine ASR data corresponding to the user input, which may correspond to a transcript of the user input. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 427).

In some embodiments, the language model orchestrator component 430 may receive other input data, which may be processed in a similar manner as the user input data 427 as described herein with respect to the natural language input data 117. The system 100 may process the input data (and/or natural language representation thereof) and may perform an action. For example, in response to detecting a garage door opening, the system 100 may cause garage lights to turn on, living room lights to turn on, etc. As another example, in response to detecting an oven beeping, the system 100 may cause a user device 410 (e.g., a smartphone, a smart speaker, etc.) to present an alert to the user. The language model orchestrator component 430 may process the input data to generate tasks that may cause the foregoing example actions to be performed.

The user input data 427 and the predicted output data 165a-n may be received at the task generation component 435, which may be configured to generate a list of (e.g., one or more) tasks (e.g., steps/actions) that are to be completed in order to perform an action responsive to the user input and select a task from the list that is to be completed first (e.g., in a current iteration of processing by the system 100). For example, for a user input of "What is the weather for today," the task generation component 435 may generate a list of tasks of "(1) determine current outside temperature from thermostat; and (2) determine weather forecast for today" and select the task of "determine weather forecast for today" to be completed first. In instances where the task generation component 435 generates more than one task to be completed in order to perform the action responsive to the user input, the task generation component 435 may further maintain and prioritize the list of tasks as the processing of the system 100 with respect to the user input is performed. In other words, as the system 100 processes to complete the list of tasks, the task generation component 435 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed.

In some embodiments, the task generation component 435 may process using language model(s) (e.g., LLMs). For example, the task generation component 435 may include a language model (e.g., an LLM) configured to generate the list of tasks that are to be completed in order to perform the action responsive to the user input and select a task of the list of tasks that is to be completed first. In some such embodiments, the user input data 427 may be received at a prompt generation component configured to generate a prompt for input to the language model of the task generation component 435. The prompt may include the user input data 427 (and/or a representation thereof) and various other information usable by the language model to generate the list of tasks that are to be completed in order to perform the action responsive to the user input. Such other information may include, for example, an indication of a remaining task(s) to be completed with respect to the user input, an indication of a potential response(s) associated with a completed task(s), and/or various contextual signals associated with the user input. The prompt may be a request for the language model to determine the list of tasks given the information included in the prompt. The language model may process the prompt to generate the list of tasks.

The task generation component 435 may generate and send task data 537 representing the selected task to be completed and various other information needed to perform further processing with respect to the task (e.g., the user input data 427, the predicted output data 165*a-n*, an indication of the selected task, potential responses associated with previous tasks, the remaining task(s), and context data associated with the user input data 427, as described in detail herein) to the language model shortlister component 440.

Application programming interfaces (APIs) are a way for one program/component to interact with another. API calls are a mechanism by which they interact. An API call, or API command, is a message sent to a system component asking an API to perform an action, provide a service or information, or the like. An API call may be formatted for the particular API and may include a particular command, optionally using particular arguments and argument values. API calls may be used for a variety of purposes, such as controlling other devices (e.g., an API call of turn_on_device (device="indoor light 1") corresponds to a command to a component to turn on a device associated with the identifier "indoor light 1"), obtaining information from other components (e.g., an API call of InfoQA.question ("Who is the president of USA?") corresponds to a command for a component to find and provide an answer to the indicated question), and performing other actions (e.g., generating synthesized speech, searching data sources, etc.).

In some embodiments, the system may include an component retrieval component configured to receive a search query and output one or more components (or component data) (e.g., executable command/API calls) matching the search query. Component data may include a component/API call, component/API description, and other information associated with the component/API and/or component/API call. In some embodiments, a language model of the system may generate an action to be performed with respect to the user input, where the action may be represented as an action description, a component/API, a component/API description, etc. Based on the generated action, the system may use the component retrieval component to determine one or more APIs available to perform the generated action. For example, in response to the user input "book a flight", the language model may generate the action "I need to find an API to book flight" or "I need to book a flight using Book.flight ([Departure], [Arrival])." Based on the generated action, the system may search the API retrieval component to determine one or more API calls corresponding to booking a flight (e.g., Bookflight.location ("departing airport code", "arrival airport code"), Bookflight.date ("departing date"), bookflight.rountrip ("departing location", "arrival location", "departure date", "return date"), AirlineBookFlight ("departing airport code", "arrival airport code"), etc.). Based on the user input and other information (e.g., context data corresponding to the user input, user preferences, past user interactions, further information received from user, etc.), the system may select one or more of the determined commands to execute.

The language model shortlister component 440 may be configured to determine one or more components (e.g., a responding component, APIs, skill component(s), language model (e.g., LLM) agent component(s), a SSG component, etc. as discussed herein) configured to perform an action related to the user input or the current task. The language model shortlister component 440 may further be configured to generate directive(s) usable to cause the execution of a command(s) (e.g., an API call(s), an incomplete API call/ API call format, an indication of an action to be performed by a component, etc.) for the one or more components to provide a potential responses(s) to the user input or current task (e.g., a response to a user-provided question, a paragraph from a website, etc.), which may further include data regarding a potential action (e.g., a description of a potential action, such as turning on a light, booking a flight ticket, ordering a pizza, etc.) the components are configured to/will perform with respect to the user input or the current task. For example, for a current task of "determine weather forecast for today," the language model shortlister component 440 may generate directives of "use Weather Application A to determine weather forecast for today" and "use Weather Application B to determine weather forecast for today," or the like.

In some embodiments, the language model shortlister component 440 may process as described above using a language model(s) (e.g., LLMs). For example, the language model shortlister component 440 may include a language model (e.g., an LLM) configured to determine one or more components configured to perform an action related to the user input or the current task and cause the execution of a command(s) for the component(s) to provide a potential response(s) to the user input or current task. In some such embodiments, the task data 537 may be received at a prompt generation component configured to generate a prompt for input to the language model of the language model shortlister component 440. The prompt may include the task data 537 (and/or a representation thereof) and an indication of component(s) (e.g., APIs) determined to be relevant to the current task/the user input. The prompt may be a request for the language model to generate a directive for a component(s) (of the components determined to be relevant) to provide a potential response(s) to the user input or current task given the information included in the prompt. The language model may process the prompt to generate the directive(s).

The directive(s) for the component(s) to provide the potential(s) responses to the user input or current task, as generated by the language model, may be represented in the action plan data 542 sent to the action plan execution component 445. The action plan execution component 445 may identify the request(s) in the action plan data 542 and generate one or more executable commands (e.g., compo nent/API calls) including one or more parameters using information included in the action plan data 542 and/or various other contextual information (e.g., speaker recognition results, a user ID, user profile information (e.g., age, gender, location, language, geographic marketplace, etc.), device ID, device profile information, device state indicators, a dialog history, and/or a interaction history associated with the user and/or the device, etc.). In some embodiments, the various contextual information may be contextual information not provided to the language model orchestrator component 430, that is, data unassociated with the processing performed by the language model orchestrator component 430. Prior to generating the executable commands, the action plan execution component 445 may modify (e.g., remove, filter, preempt, etc.) a directive included in the action plan data 542 that is determined to be in conflict with a system operating policy.

The action plan execution component 445 may generate one or more additional executable commands corresponding to directives not included in the action plan data 542. Thereafter, the action plan execution component 445 may, using the executable API calls and/or the additional executable API calls, cause the corresponding responding components 445a-n to generate the action response data 555a-n representing the requested potential response(s), where individual action response data 555a may be provided by/correspond to a particular responding component. Prior to sending the action response data 555a-n to the language shortlister component 440, the action plan execution component 445 may remove/filter action response data 555a-n that is determined to include information not beneficial to the processing of the language shortlister component 440.

In some embodiments, the action response data 555a-n may include an identifier (e.g., a component name, an alphanumerical value associated with the component, etc.) for the component providing the data. The language model shortlister component 440 receives and processes the action response data 555a-n and generates potential response data 543a-n representing the potential response(s) (e.g., relevant potential responses, selected potential responses, ranked potential responses, etc.) for further processing (e.g., as described in detail herein). If the language model shortlister component 440 determines that there are no remaining tasks to generate potential responses for, the language model shortlister component 440 may send the potential response data 543a-n to the response arbitration component 460.

The potential response data 543a-n, in some embodiments, may be determined based on receiving potential responses from various different components that may be involved in responding to the user input data 427. For example, the potential response data 543a-n may include a first potential response from a first component configured to perform a first task determined by the task generation component 435, a second potential response from a second component configured to perform a second task determined by the task generation component 435, etc. The potential response data 543a-n can include more than one potential response relating to an individual task. In some embodiments, the potential response data 543a-n may include data in a natural language form.

The response arbitration component 460 processes the potential response data 543a-n to determine whether the potential responses generated for the task(s) are responsive to the user input. The response arbitration component 460 processes the potential response data 543a-n (representing at least the generated potential responses) and selects one or more of the potential responses that are determined to be responsive to the user input and/or determines that none of the actions are responsive to the user input. For example, the response arbitration component 460 may process the potential response data 543a-n to determine if one or more of the potential responses performable by the API(s) (e.g., the potential responses and/or potential actions) are responsive to the current task. In some embodiments, the response arbitration component 460 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 460 may generate a natural language summary of "The weather for today is expected to be mostly sunny with a high of 75 and a low of 68 and a slight chance of rain in the evening," or the like.

In some embodiments, the response arbitration component 460 may process as described above using language model(s) (e.g., LLMs). For example, the response arbitration component 460 may include a language model (e.g., an LLM) configured to generate a response to the user input using one or more of the potential responses that are determined to be responsive to the user input and/or determines that none of the potential responses are responsive to the user input. In some such embodiments, the user input data 427 and the potential responses (and in some embodiments, the contextual signals associated with the user input) may be received at a prompt generation component configured to generate a prompt for input to the language model including the information. The prompt may be a request for the language model to, given the information included in the prompt, generate a response to the user input using one or more of the potential responses that are determined to be responsive to the user input and/or indicate that none of the potential responses are responsive to the user input. The language model may process the prompt to generate the response to the user input or the indication that none of the potential response are responsive to the user input. In instances where the language model generates the indication that none of the potential responses are responsive to the user input, the indication may further include a request for information to be output to the user (and/or provided to another component of the system configured to determine the information).

The output generated by the response arbitration component 460 may be provided to one or more components of the system 100 (e.g., the SSG component 656, a visual output component, etc. via, for example, the action plan execution component 445) and/or sent to the device 410 for output to the user.

In some embodiments, the prompts input to the language model described herein may include a request for the language models to output a response that satisfies certain conditions. Such conditions may relate to generating a response that is unbiased (toward protected classes, such as gender, race, age, etc.), non-harmful, profanity-free, etc. For example, prompt data generated by a prompt generation component described herein may include "Please generate a polite, respectful, and safe response and one that does not violate protected class policy."

As discussed above, the compliance component 470 may be configured to determine whether an output generated/to be generated by a language model of the language model orchestrator component 430 is appropriate for output to a user 405. As shown in FIG. 5, the compliance component 470 may be configured to process model output data 575a-n representing outputs of a language model(s) while generating a response to the user input. The compliance component 470 may determine whether the model output data 575a-n is appropriate for output to the user 405. Example model output data 575a-n may include the task data 537, the action plan data 542, the responsive output data 462, and/or any other language model-generated output discussed herein. As further shown in FIG. 5, the compliance component 470 may be further configured to process the user input data 427 to determine whether the corresponding user input may result in a language model generating a response to the user input that is appropriate for output to the user 405.

In some embodiments, the compliance component 470 may determine that the model output data 575a-n or model output data to be generated based on the user input data 427 is appropriate for output to a user 405 based on whether the model output data 575a-n and/or the user input data 427 corresponds to training data processed by the corresponding language model during training. Additionally, or alternatively, the compliance component 470 may determine that the model output data 575a-n or model output data to be generated based on the user input data 427 is appropriate for output to a user 405 based on whether the model output data 575a-n and/or the user input data 427 corresponds to one or more natural language words determined to be confidential, sensitive, or offensive.

The compliance component 470 may include or otherwise be in communication with one or more storages. In some embodiments, a storage(s) may include a plurality of training data, which may be stored in association with a language model identifier indicating a language model(s) that was trained using the training data. In some such embodiments, the model output data 575a-n may further include, or the compliance component 470 may further receive, a language model identifier corresponding to the language model that generated the model output data 575a-n/the language model that is to process the user input data 427. Additionally, or alternatively, a storage(s) may include a plurality of natural language words determined to be confidential, sensitive, or offensive. The compliance component 470 may be configured to query the storage(s) using the model output data 575a-n/the user input data 427 or one or more entities included in the model output data 575a-n/the user input data 427 to determine whether the model output data 575a-n/user input data 427 includes information included in the storage(s).

If the compliance component 470 determines that the model output data 575a-n/the model output data to be generated based on the user input data 427 is appropriate for output to the user 405, the compliance may send the model output data 575a-n/user input data 427 to the language model orchestrator component 430 to continue processing. If, instead, the compliance component 470 determines that the model output data 575a-n/the model output data to be generated based on the user input data 427 is not appropriate for output to the user 405, then the compliance component 470 may cause a remedial action to be performed. For example, the compliance component 470 may cause new model output data 575a-n to be generated. In some such examples, the compliance component 470 or the component including the language model may cause new prompt data to be generated, which may include the original prompt data, the model output data 575a-n, and an indication that the model output data 575a-n is not appropriate for output to the user 405. The new prompt data may be a request to generate new model output data 575a-n that is appropriate for output to the user 405. For further example, the compliance component 470 may cause the user device 410 to output a generic response (e.g., "Sorry, I can't help you with that") or a request for a rephrased input (e.g., "can you rephrase that").

In some embodiments, the compliance component 470 may cause the user device 410 to output a response indicating to the user 405 where the information being requested by the user 405 may be found. For example, the storage including the training data may further include an indication of a source of the training data (e.g., a natural language description of an owner of intellectual property rights corresponding to the training data/the information being requested, a hyperlink to a source of the training data/information being requested, etc.) such that the compliance component 470 may cause the user device 410 to output the indication of the source of the training data.

In some embodiments, one or more of the language models discussed herein may be fine-tuned to perform a particular task(s). Fine-tuning of the language model(s) may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of a language model discussed herein indicates that additional information is needed to complete a first task associated with a user input, a request for the additional information may be sent to the personalized context component 465. Thereafter, the language model may continue to process to complete it's configured operations. For example, while the personalized context component 465 is processing to determine the additional information (e.g., the personalized context data 567), the system 100 may begin processing with respect to a second task associated with the user input.

Thereafter, the personalized context data 567 may be sent to the language model (or another language model, such as the response arbitration component 460) such that once the language model (or the other language model) receives the output of the personalized context component 465, the language model may resolve the ambiguity in order to generate a response to the user input. For further example, if the user input data 427 is generated to include the natural language representation of the user input, but the processing required to determine the corresponding contextual signals (e.g., weather data, time of data, dialog history, device information, etc.) is yet to be completed, a language model (e.g., the task generation component 435) may begin processing with respect to the natural language representation of the user input. Once the corresponding contextual signals have been generated, the language model (e.g., the task generation component 435) may begin processing with respect to the contextual signals and may update downstream language models/components/processing with the result of the processing with respect to the contextual signals.

As another example, if the task generation component 435 determines that more than one task is to be completed to perform an action responsive to a user input, and the language model shortlister component 440 processes as described herein above to cause one or more components to generate potential responses with respect to a first task of the more than one tasks, the language model shortlister component 440 may send the potential responses (and a representation of the user input and the current task) to the response arbitration component 460 to process as described herein above with respect to those potential responses while the system 100 (e.g., the task generation component 435 and/or the language model shortlister component 440) completes processing with respect to the remaining tasks of the one or more tasks. Therefore, the response arbitration component 460 may process as described herein to select between the potential responses associated with the first task while the potential responses associated with one or more of the remaining tasks is completed. As such, the response arbitration component 460 may only need to arbitrate between the potential responses associated with the first task that were previously selected by the response arbitration component 460 as being responsive to the first task when the response arbitration component 460 later processes with respect to further potential responses associated with further tasks.

As a further example, if the language model shortlister component 440 determines (e.g., with a confidence value that meets or exceeds a particular threshold) that a particular component is configured to perform an action related to the user input, the language model shortlister component 440 may begin processing with respect to the related component while the language model shortlister component 440 continues to determine one or more further related components. In general, the system 100 is capable of performing such streaming and processing of portions of data discussed herein (e.g., for processing with respect to a user input) and updating language models/components/processing with the results of processing of newly available portions of data as the data becomes available for processing.

Figure 6:
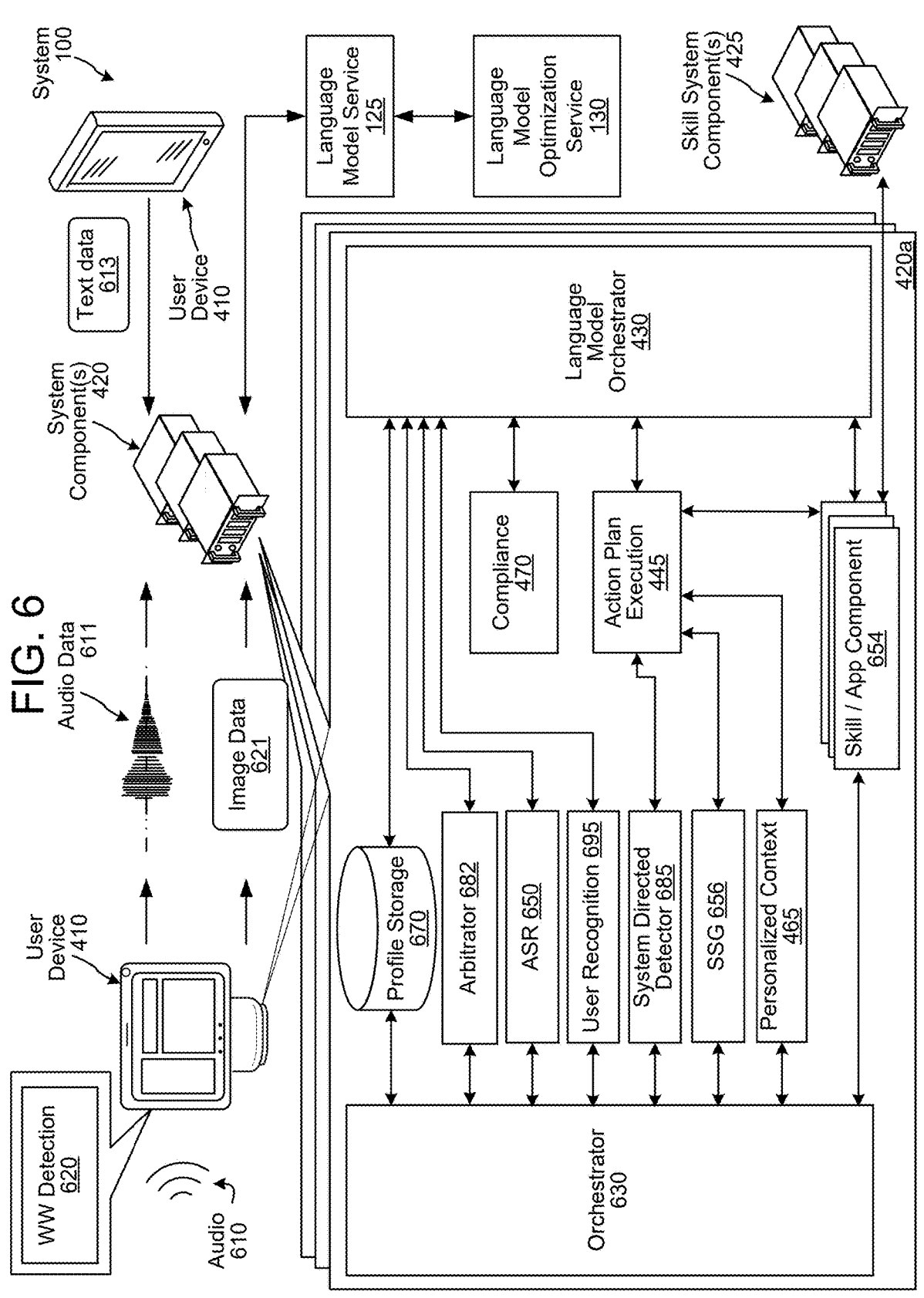
FIG. 6 is a conceptual diagram illustrating components of the system, according to embodiments of the present disclosure.

The system 100 may operate using various components as described in FIG. 6. The various components may be located on same or different physical devices. Communication between various components may occur directly or across a network(s) 499. The user device 410 may include audio capture component(s), such as a microphone or array of microphones of a user device 410, captures audio 610 and creates corresponding audio data. Once speech is detected in audio data representing the audio 610, the user device 410 may determine if the speech is directed at the user device 410/system component(s). In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of user device 410. Other input forms may include indication that the user has pressed a physical or virtual button on user device 410, the user has made a gesture, etc. The user device 410 may also capture images using camera(s) of the user device 410 and may send image data 621 representing those image(s) to the system component(s). The image data 621 may include raw image data or image data processed by the user device 410 before sending to the system component(s). The image data 621 may be used in various manners by different components of the system to perform operations such as determining whether a user is directing an utterance to the system, interpreting a user command, responding to a user command, etc.

The wakeword detection component 620 of the user device 410 may process the audio data, representing the audio 610, to determine whether speech is represented therein. The user device 410 may use various techniques to determine whether the audio data includes speech. In some examples, the user device 410 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 410 may implement a classifier configured to distinguish speech from background noise. The classifier may be implemented by techniques such as linear classifiers, support vector machines, and decision trees. In still other examples, the user device 410 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 610, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 620 and/or input is detected by an input detector, the user device 410 may "wake" and begin transmitting audio data 611, representing the audio 610, to the system component(s) 420. The audio data 611 may include data corresponding to the wakeword; in other embodiments, the portion of the audio corresponding to the wakeword is removed by the user device 410 prior to sending the audio data 611 to the system component(s) 420. In the case of touch input detection or gesture based input detection, the audio data may not include a wakeword.

In some implementations, the system 100 may include more than one system component(s). The system component(s) 420 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 620 may result in sending audio data to system component(s) 420*a* for processing while detection of the wakeword "Computer" by the wakeword detector may result in sending audio data to system component(s) 420*b* for processing. The system may have a separate wakeword and system for different skills/systems (e.g., "Castle Adverture" for a game play skill/system component(s) 420*c*) and/or such skills/systems may be coordinated by one or more skill component(s) 654 of one or more system component(s) 420.

The user device 410/system component(s) 420 may also include a system directed input detector 685. The system directed input detector 685 may be configured to determine whether an input to the system (for example speech, a gesture, etc.) is directed to the system or not directed to the system (for example directed to another user, etc.). The system directed input detector 685 may work in conjunction with the wakeword detection component 620. If the system directed input detector 685 determines an input is directed to the system, the user device 410 may "wake" and begin sending captured data for further processing. If data is being processed the user device 410 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 685 determines an input is not directed to the system (such as a speech or gesture directed to another user) the user device 410 may discard the data and take no further action for processing purposes. In this way the system 100 may prevent processing of data not directed to the system, thus protecting user privacy. As an indicator to the user, however, the system may output an audio, visual, or other indicator when the system directed input detector 685 is determining whether an input is potentially device directed. For example, the system may output an orange indicator while considering an input, and may output a green indicator if a system directed input is detected. Other such configurations are possible.

Upon receipt by the system component(s) 420, the audio data 611 may be sent to an orchestrator component 630 and/or the language model orchestrator component 430. The orchestrator component 630 may include memory and logic that enables the orchestrator component 630 to transmit various pieces and forms of data to various components of the system, as well as perform other operations as described herein. In some embodiments, the orchestrator component 630 may optionally be included in the system component(s) 420. In embodiments where the orchestrator component 630 is not included in the system component(s) 420, the audio data 611 may be sent directly to the language model orchestrator component 430. Further, in such embodiments, each of the components of the system component(s) 420 may be configured to interact with the language model orchestrator component 430, the action plan execution component 445, the API provider component, and/or other component(s).

In some embodiments, the system component(s) 420 may include an arbitrator component 682, which may be configured to determine whether the orchestrator component 630 and/or the language model orchestrator component 430 are to process with respect to user input data. In some embodiments, the language model orchestrator component 430 may be selected to process with respect to the audio data 611 only if the user 405 associated with the audio data 611 (or the user device 410 that captured the audio 610) has previously indicated that the language model orchestrator component 430 may be selected to process with respect to user inputs received from the user 405.

In some embodiments, the arbitrator component 682 may determine the orchestrator component 630 and/or the language model orchestrator component 430 are to process with respect to the audio data 611 based on metadata associated with the audio data 611. For example, the arbitrator component 682 may be a classifier configured to process a natural language representation of the audio data 611 (e.g., output by the ASR component 650) and classify the corresponding user input as to be processed by the orchestrator component 630 and/or the language model orchestrator component 430. For further example, the arbitrator component 682 may determine whether the device from which the audio data 611 is received is associated with an indicator representing the audio data 611 is to be processed by the orchestrator component 630 and/or the language model orchestrator component 430. As an even further example, the arbitrator component 682 may determine whether the user (e.g., determined using data output from the user recognition component 695) from which the audio data 611 is received is associated with a user profile including an indicator representing the audio data 611 is to be processed by the orchestrator component 630 and/or the language model orchestrator component 430. As another example, the arbitrator component 682 may determine whether the audio data 611 (or the output of the ASR component 650) corresponds to a request representing that the audio data 611 is to be processed by the orchestrator component 630 and/or the language model orchestrator component 430 (e.g., a request including "let's chat" may represent that the audio data 611 is to be processed by the language model orchestrator component 430).

In some embodiments, if the arbitrator component 682 is unsure (e.g., a confidence score corresponding to whether the orchestrator component 630 and/or the language model orchestrator component 430 is to process is below a threshold), then the arbitrator component 682 may send the audio data 611 to both of the orchestrator component 630 and the language model orchestrator component 430. In such embodiments, the orchestrator component 630 and/or the language model orchestrator component 430 may include further logic for determining further confidence scores during processing representing whether the orchestrator component 630 and/or the language model orchestrator component 430 should continue processing, as is discussed further herein below.

The arbitrator component 682 may send the audio data 611 to an ASR component 650. In some embodiments, the component selected to process the audio data 611 (e.g., the orchestrator component 630 and/or the language model orchestrator component 430) may send the audio data 611 to the ASR component 650. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to the arbitrator component 682, the orchestrator component 630, and/or the language model orchestrator component 430. In instances where the text data is sent to the arbitrator component 682, the arbitrator component 682 may send the text data to the component selected to process the audio data 611 (e.g., the orchestrator component 630 and/or the language model orchestrator component 430). The text data sent from the ASR component 650 to the arbitrator component 682, the orchestrator component 630, and/or the language model orchestrator component 430 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 630 may cause a NLU component (not shown) to perform processing with respect to the ASR data generated by the ASR component 650. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 410, the system component(s) 420, a skill/app component 654, a skill system component(s) 425, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 410. In another example, if the ASR data corresponds to "turn off the lights," the NLU component may determine an intent that the system turn off lights associated with the device 410 or the user 405. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 630. The orchestrator component 630 may forward the NLU results data to a skill component(s) 654. If the NLU results data includes a single NLU hypothesis, the NLU component and the orchestrator component 630 may direct the NLU results data to the skill component(s) 654 associated with the NLU hypothesis. If the NLU results data includes an N-best list of NLU hypotheses, the NLU component and the orchestrator component 630 may direct the top scoring NLU hypothesis to a skill component(s) 654 associated with the top scoring NLU hypothesis. The system may also include a post-NLU ranker which may incorporate other information to rank potential interpretations determined by the NLU component.

In some embodiments, after determining that the orchestrator component 630 and/or the language model orchestrator component 430 should process with respect to the user input data 427, the arbitrator component 682 may be configured to periodically determine whether the orchestrator component 630 and/or the language model orchestrator component 430 should continue processing with respect to the user input data 427. For example, after a particular point in the processing of the orchestrator component 630 (e.g., after performing NLU, prior to determining a skill component 654 to process with respect to the user input data 427, prior to performing an action responsive to the user input, etc.) and/or the language model orchestrator component 430 (e.g., after selecting a task to be completed, after receiving the action response data from the one or more components, after completing a task, prior to performing an action responsive to the user input, etc.) the orchestrator component 630 and/or the language model orchestrator component 430 may query the arbitrator component 682 has determined that the orchestrator component 630 and/or the language model orchestrator component 430 should halt processing with respect to the user input data 427. As discussed above, the system 100 may be configured to stream portions of data associated with processing with respect to a user input to the one or more components such that the one or more components may begin performing their configured processing with respect to that data as soon as it is available to the one or more components. As such, the arbitrator component 682 may cause the orchestrator component 630 and/or the language model orchestrator component 430 to begin processing with respect to a user input as soon as a portion of data associated with the user input data 427 is available (e.g., the ASR data, context data, output of the user recognition component 695. Thereafter, once the arbitrator component 682 has enough data to perform the processing described herein above to determine whether the orchestrator component 630 and/or the language model orchestrator component 430 is to process with respect to the user input, the arbitrator component 682 may inform the corresponding component (e.g., the orchestrator component 630 and/or the language model orchestrator component 430) to continue/halt processing with respect to the user input at one of the logical checkpoints in the processing of the orchestrator component 630 and/or the language model orchestrator component 430.

As discussed herein above, in some embodiments, the language model shortlister component 440 (e.g., via the API retrieval component 442 and/or the shortlister language model 443) may be configured to select the orchestrator component 630 to process with respect to the user input and/or a current task to return action response data (e.g., the action response data 555a) representing a response to the user input/current task or a description of an action the orchestrator component 630 may cause to be performed in response to the user input/current task. As such, in some embodiments, although the language model orchestrator component 430 is determined to process with respect to a user input, the language model orchestrator component 430 may determine, during such processing, that the orchestrator component 630 should process with respect to the user input.

A skill system component(s) 425 may communicate with a skill/app component(s) 654 within the system component(s) 420 directly with the orchestrator component 630 and/or the action plan execution component 445, or with other components. A skill system component(s) 425 may be configured to perform one or more actions. An ability to perform such action(s) may sometimes be referred to as a "skill." That is, a skill may enable a skill system component(s) 425 to execute specific functionality in order to provide data or perform some other action requested by a user. For example, a weather service skill may enable a skill system component(s) 425 to provide weather information to the system component(s) 420, a car service skill may enable a skill system component(s) 425 to book a trip with respect to a taxi or ride sharing service, an order pizza skill may enable a skill system component(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 420 may be configured with a skill component 654 dedicated to interacting with the skill system component(s) 425. Unless expressly stated otherwise, reference to a skill, skill device, or skill component may include a skill component 654 operated by the system component(s) 420 and/or skill operated by the skill system component(s) 425. Moreover, the functionality described herein as a skill or skill may be referred to using many different terms, such as an action, bot, app, or the like. The skill component 654 and or skill system component(s) 425 may return output data to the orchestrator component 630.

The system component(s) includes a SSG component 656. The SSG component 656 may generate audio data (e.g., synthesized speech) from text data using one or more different methods. Text data input to the SSG component 656 may come from a skill component 654, the orchestrator component 630, or another component of the system. In one method of synthesis called unit selection, the SSG component 656 matches text data against a database of recorded speech. The SSG component 656 selects matching units of recorded speech and concatenates the units together to form audio data. In another method of synthesis called parametric synthesis, the SSG component 656 varies parameters such as frequency, volume, and noise to create audio data including an artificial speech waveform. Parametric synthesis uses a computerized voice generator, sometimes called a vocoder.

The user device 410 may include still image and/or video capture components such as a camera or cameras to capture one or more images. The user device 410 may include circuitry for digitizing the images and/or video for transmission to the system component(s) 420 as image data. The user device 410 may further include circuitry for voice command-based control of the camera, allowing a user 405 to request capture of image or video data. The user device 410 may process the commands locally or send audio data 611 representing the commands to the system component(s) 420 for processing, after which the system component(s) 420 may return output data that can cause the user device 410 to engage its camera.

The system component(s) 420/the user device 410 may include a user recognition component 695 that recognizes one or more users using a variety of data. However, the disclosure is not limited thereto, and the user device 410 may include the user recognition component 695 instead of and/or in addition to the system component(s) 420 without departing from the disclosure.

The user recognition component 695 may take as input the audio data 611 and/or text data output by the ASR component 650. The user recognition component 695 may perform user recognition by comparing audio characteristics in the audio data 611 to stored audio characteristics of users. The user recognition component 695 may also perform user recognition by comparing biometric data (e.g., fingerprint data, iris data, etc.), received by the system in correlation with the present user input, to stored biometric data of users assuming user permission and previous authorization. The user recognition component 695 may further perform user recognition by comparing image data (e.g., including a representation of at least a feature of a user), received by the system in correlation with the present user input, with stored image data including representations of features of different users. The user recognition component 695 may perform additional user recognition processes, including those known in the art.

The user recognition component 695 determines scores indicating whether user input originated from a particular user. For example, a first score may indicate a likelihood that the user input originated from a first user, a second score may indicate a likelihood that the user input originated from a second user, etc. The user recognition component 695 also determines an overall confidence regarding the accuracy of user recognition operations.

Output of the user recognition component 695 may include a single user identifier corresponding to the most likely user that originated the user input. Alternatively, output of the user recognition component 695 may include an N-best list of user identifiers with respective scores indicating likelihoods of respective users originating the user input. The output of the user recognition component 695 may be used to inform processing of the arbitrator component 682, the orchestrator component 630, and/or the language model orchestrator component 430 as well as processing performed by other components of the system.

The system component(s) 420/user device 410 may include a presence detection component that determines the presence and/or location of one or more users using a variety of data.

The system 100 (either on user device 410, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 410, the user profile (associated with the presented login information) may be updated to include information about the user device 410, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 6 may be illustrated as part of system component(s) 420, user device 410, or otherwise, the components may be arranged in other device(s) (such as in user device 410 if illustrated in system component(s) 420 or vice-versa, or in other device(s) altogether) without departing from the disclosure.

In at least some embodiments, the system component(s) may receive the audio data 611 from the user device 410, to recognize speech corresponding to a spoken input in the received audio data 611, and to perform functions in response to the recognized speech. In at least some embodiments, these functions involve sending directives (e.g., commands), from the system component(s) to the user device 410 (and/or other user devices 410) to cause the user device 410 to perform an action, such as output an audible response to the spoken input via a loudspeaker(s), and/or control secondary devices in the environment by sending a control command to the secondary devices.

Thus, when the user device 410 is able to communicate with the system component(s) over the network(s) 499, some or all of the functions capable of being performed by the system component(s) may be performed by sending one or more directives over the network(s) 499 to the user device 410, which, in turn, may process the directive(s) and perform one or more corresponding actions. For example, the system component(s), using a remote directive that is included in response data (e.g., a remote response), may direct the user device 410 to output an audible response (e.g., using SSG processing performed by an on-device SSG component) to a user's question via a loudspeaker(s) of (or otherwise associated with) the user device 410, to output content (e.g., music) via the loudspeaker(s) of (or otherwise associated with) the user device 410, to display content on a display of (or otherwise associated with) the user device 410, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 405 as part of a shopping function, establishing a communication session (e.g., a video call) between the user 405 and another user, and so on.

In at least some embodiments, the user device 410, may send the audio data 611 to the wakeword detection component 620. If the wakeword detection component 620 detects a wakeword in the audio data 611, the wakeword detection component 620 may send an indication of such detection to the user device 410. In response to receiving the indication, the audio data 611 may be sent to the system component(s) 420 and/or the ASR component of the user device 410. The wakeword detection component 620 may also send an indication, to the user device 410, representing a wakeword was not detected. In response to receiving such an indication, the audio data 611 may not be sent to the system component(s) 420, and the user device 410 may prevent the ASR component of the user device 410 from further processing the audio data 611. In this situation, the audio data 611 can be discarded.

In some embodiments, the user device 410 may include some or all of the components illustrated in FIG. 6 and/or discussed herein above with respect to the system component(s) 420. In other embodiments, the components illustrated in FIG. 6 and/or discussed herein with respect to the system component(s) 420 may be distributed across the user device 410 and the system component(s) 420.

In at least some embodiments, the components of the user device 410 (e.g., on-device components) may not have the same capabilities as the components of the system component(s). For example, on-device components may be configured to generate a response to only a subset of the natural language user inputs that may be handled by the system component(s) 420. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 410 attempts to process a natural language user input for which the on-device components are not necessarily best suited, the language processing results determined by the user device 410 may indicate a low confidence or other metric indicating that the processing by the user device 410 may not be as accurate as the processing done by the system component(s).

In some embodiments, such as when the audio data 611 is sent to the system component(s) 420 and the ASR component of the user device 410. The system component(s) 420 and the ASR component of the user device 410 may process as described herein to generate responses to the user input corresponding to the audio data 611. The system component(s) 420 may send the response to the user device 410 and the user device 410 may determine whether to output the response generated by the system component(s) 420 or the response generated by the user device 410. In some embodiments, the system component(s) 420 may be configured to perform a portion of the processing described herein, such as a portion of processing not performable by the user device 410, and send the result of such processing to the user device 410. The user device 410 may be configured to determine whether to use the result to complete processing to generate the response to the user device 410.

In at least some embodiments, the user device 410 may include, or be configured to use, one or more skill components that may work similarly to the skill component(s) 654 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 410 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 410 may be in communication with one or more skill system component(s) 425. For example, a skill system component(s) 425 may be located in a remote environment (e.g., separate location) such that the user device 410 may only communicate with the skill system component(s) 425 via the network(s) 499. However, the disclosure is not limited thereto. For example, in at least some embodiments, a skill system component(s) 425 may be configured in a local environment (e.g., home server and/or the like) such that the user device 410 may communicate with the skill system component(s) 425 via a private network, such as a local area network (LAN).

Figure 7:
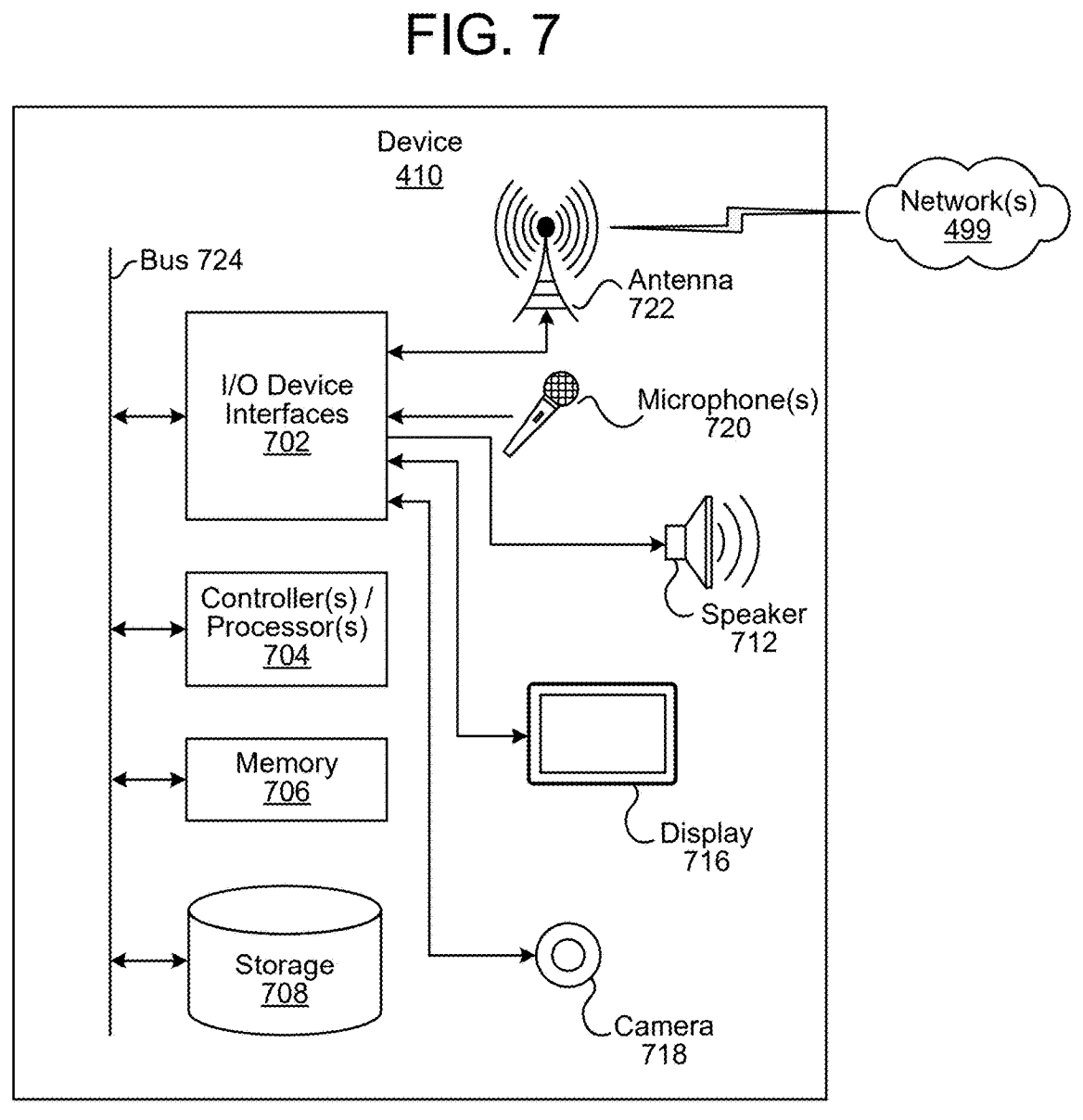
Figure 8:
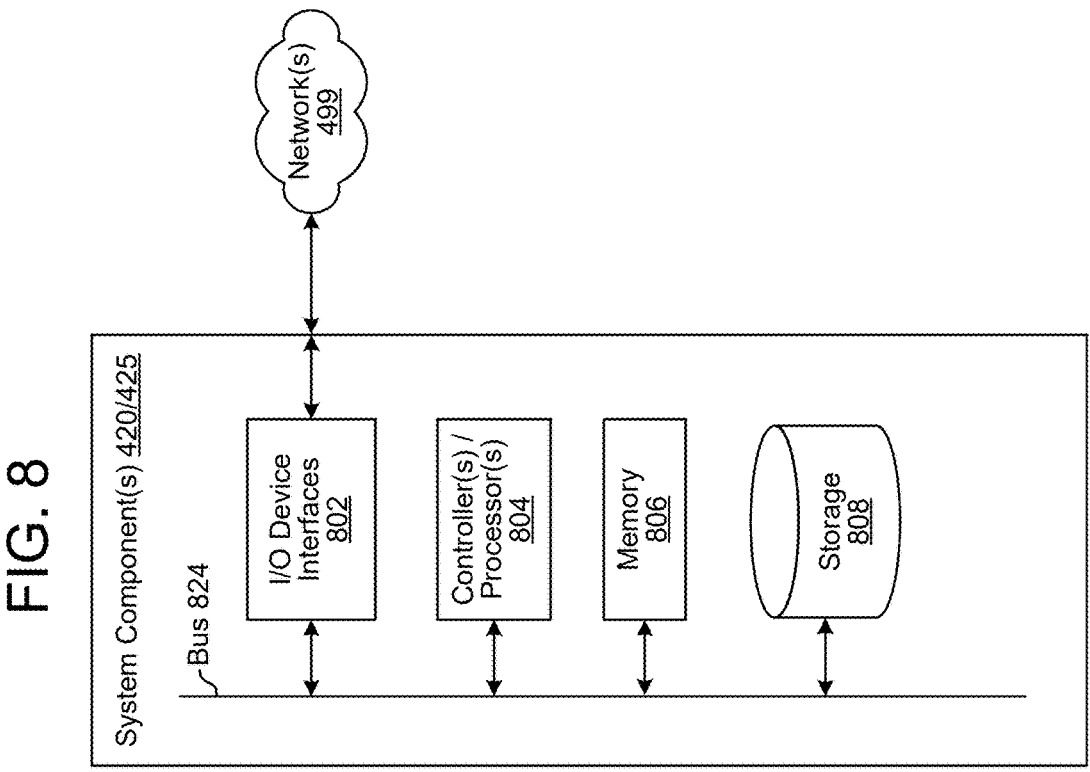
FIG. 8 is a block diagram conceptually illustrating example components of a system, according to embodiments of the present disclosure.

FIG. 7 is a block diagram conceptually illustrating a user device 410 that may be used with the system. FIG. 8 is a block diagram conceptually illustrating example components of a remote device, such as the natural language command processing system component(s), which may assist with ASR processing, NLU processing, etc., and a skill system component(s) 425. System component(s) (420/

425) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 410 may operate locally to a user (e.g., within a same environment so the device may receive inputs and playback outputs for the user) the server/system component(s) may be located remotely from the user device 410 as its operations may not require proximity to the user. The server/system component(s) may be located in an entirely different location from the user device 410 (for example, as part of a cloud computing system or the like) or may be located in a same environment as the user device 410 but physically separated therefrom (for example a home server or similar device that resides in a user's home or business but perhaps in a closet, basement, attic, or the like). The system component(s) 420 may also be a version of a user device 410 that includes different (e.g., more) processing capabilities than other user device(s) 410 in a home/office. One benefit to the server/system component(s) being in a user's home/business is that data used to process a command/return a response may be kept within the user's home, thus reducing potential privacy concerns.

Multiple system components (420/425) may be included in the overall system 100 of the present disclosure, such as one or more natural language processing system component(s) 420 for performing ASR processing, one or more natural language processing system component(s) 420 for performing NLU processing, one or more skill system component(s) 425, etc. In operation, each of these systems may include computer-readable and computer-executable instructions that reside on the respective device (420/425), as will be discussed further below.

Each of these devices (410/420/425) may include one or more controllers/processors (704/804), which may each include a central processing unit (CPU) for processing data and computer-readable instructions, and a memory (706/806) for storing data and instructions of the respective device. The memories (706/806) may individually include volatile random-access memory (RAM), non-volatile read only memory (ROM), non-volatile magnetoresistive memory (MRAM), and/or other types of memory. Each device (410/420/425) may also include a data storage component (708/808) for storing data and controller/processor-executable instructions. Each data storage component (708/808) may individually include one or more non-volatile storage types such as magnetic storage, optical storage, solid-state storage, etc. Each device (410/420/425) may also be connected to removable or external non-volatile memory and/or storage (such as a removable memory card, memory key drive, networked storage, etc.) through respective input/output device interfaces (702/802).

Computer instructions for operating each device (410/420/425) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (410/420/425) includes input/output device interfaces (702/802). A variety of components may be connected through the input/output device interfaces (702/802), as will be discussed further below. Additionally, each device (410/420/425) may include an address/data bus (724/824) for conveying data among components of the respective device. Each component within a device (410/420/425) may also be directly connected to other components in addition to (or instead of) being connected to other components across the bus (724/824).

Referring to FIG. 7, the user device 410 may include input/output device interfaces 702 that connect to a variety of components such as an audio output component such as a speaker 712, a wired headset or a wireless headset (not illustrated), or other component capable of outputting audio. The user device 410 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 410 may additionally include a display 716 for displaying content. The user device 410 may further include a camera 718.

Via antenna(s) 722, the input/output device interfaces 702 may connect to one or more networks 499 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 499, the system may be distributed across a networked environment. The I/O device interface (702/802) may also include communication components that allow data to be exchanged between devices such as different physical servers in a collection of servers or other components.

The components of the user device(s) 410, the natural language command processing system component(s), or a skill system component(s) 425 may include their own dedicated processors, memory, and/or storage. Alternatively, one or more of the components of the user device(s) 410, the natural language command processing system component(s), or a skill system component(s) 425 may utilize the I/O interfaces (702/802), processor(s) (704/804), memory (706/806), and/or storage (708/808) of the user device(s) 410, natural language command processing system component(s), or the skill system component(s) 425, respectively. Thus, the ASR component 650 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 410, the natural language command processing system component(s), and a skill system component(s) 425, as described herein, are illustrative, and may be located as a stand-alone device or may be included, in whole or in part, as a component of a larger device or system. As can be appreciated, a number of components may exist either on a system component(s) and/or on user device 410. For example, ASR component 650 and SSG component 656), etc., for example as illustrated in FIG. 6. Unless expressly noted otherwise, the system version of such components may operate similarly to the device version of such components and thus the description of one version (e.g., the system version or the local version) applies to the description of the other version (e.g., the local version or system version) and vice-versa.

Figure 9:
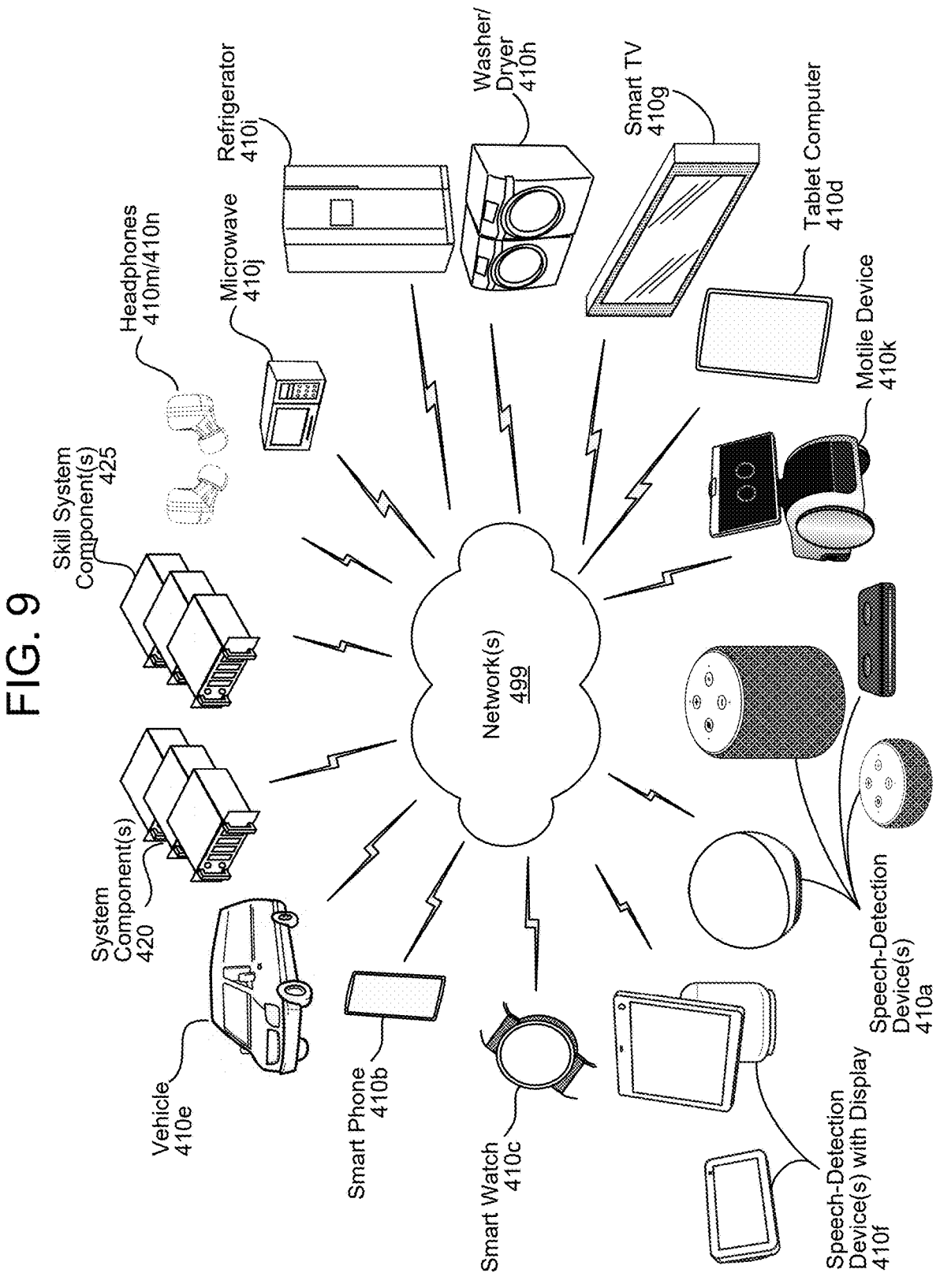
FIG. 9 illustrates an example of a network for use with the overall system, according to embodiments of the present disclosure.

As illustrated in FIG. 9, multiple devices (410a-410n, 420, 425) may contain components of the system and the devices may be connected over a network(s) 499. The network(s) 499 may include a local or private network or may include a wide network such as the Internet. Devices may be connected to the network(s) 499 through either wired or wireless connections. For example, a speech-detection user device 410a, a smart phone 410b, a smart watch 410c, a tablet computer 410d, a vehicle 410e, a speech-detection device with display 410f, a display/smart television 410g, a washer/dryer 410h, a refrigerator 410i, a microwave 410j, autonomously motile user device 410k (e.g., a robot), etc., may be connected to the network(s) 499 through a wireless service provider, over a Wi-Fi or cellular network connection, or the like. Other devices are included as network-connected support devices, such as the natural language command processing system component(s) 420, the skill system component(s) 425, and/or others. The support devices may connect to the network(s) 499 through a wired connection or wireless connection. Networked devices may capture audio using one-or-more built-in or connected microphones or other audio capture devices, with processing performed by ASR components, NLU components, or other components of the same device or another device connected via the network(s) 499, such as the ASR component 650, etc. of the natural language command processing system component(s) 420.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving a first set of natural language input data corresponding to a first set of user inputs, the first set of natural language input data to be processed using an application;

based on the first set of natural language input data, retrieving, from a first optimization cache associated with a first optimization component, a first set of historical output data including a first set of prior responses, the first optimization component being associated with a speculative processing technique;

based on the first set of natural language input data, retrieving, from a second optimization cache associated with a second optimization component, a second set of historical output data including a second set of prior responses;

determining the first set of historical output data is larger than the second set of historical output data;

based on the first set of historical output data being larger than the second set of historical output data, determining first optimization plan data indicating the first optimization component is to be used to generate responses to input data corresponding to the application;

determining an application identifier (ID) associated with the application;

storing the first optimization plan data in a first storage in association with the application ID;

receiving first natural language input data corresponding to a first user input, the first natural language input data to be processed using the application;

receiving first context data including the application ID associated with the application;

using the application ID, retrieving, from the first storage, the first optimization plan data;

based on the first optimization plan data, sending the first natural language input data and the first context data to the first optimization component;

retrieving, from the first optimization cache, first historical output data corresponding to a first prior response to a first prior user input, the first prior user input determined by the first optimization component to correspond to the first user input;

sending, to the application, an indication of the first optimization component to instruct processing by a first language model of the first natural language input data; and sending the first historical output data to the application to be processed by the first language model corresponding to the application to generate first response data corresponding to the first user input, wherein the first response data includes at least a first portion of the first historical output data.

2. The computer-implemented method of claim 1, further comprising:

receiving, from the application, feedback data indicating user satisfaction with the first response data;

based on the first response data and the feedback data, determining performance metric data corresponding to the processing of the first optimization component; and storing the first response data in the first optimization cache further based on the performance metric data.

3. The computer-implemented method of claim 1, wherein the first optimization plan data further indicates the second optimization component is to be used to generate responses to input data corresponding to the application, and the method further comprises:

based on the first optimization plan data, sending the first natural language input data and the first context data to the second optimization component;

retrieving, from the second optimization cache associated with the second optimization component, second historical output data corresponding to a second prior response to a second prior user input, the second prior user input determined by the second optimization component to correspond to the first user input;

determining a first semantic similarity between the first natural language input data and the first historical output data;

determining a second semantic similarity between the first natural language input data and the second historical output data; and based on the first semantic similarity and the second semantic similarity, determining to send the first historical output data to the application, instead of the second historical output data.

4. The computer-implemented method of claim 1, further comprising:

based on the first response data, determining optimization metrics data representing a performance of processing performed by the first optimization component with respect to the first natural language input data; and based on the optimization metrics data, determining second optimization plan data indicating that the second optimization component is to be used to generate responses to input data corresponding to the application, instead of the first optimization component.

5. A computer-implemented method comprising:

receiving a first set of historical input data;

based on the first set of historical input data, determining a first optimization component is to process future input data associated with the first set of historical input data, wherein the first optimization component is associated with a first technique to be performed to respond to the future input data;

receiving first input data to be processed, the first input data being associated with the first set of historical input data;

based on the first input data being associated with the first set of historical input data, selecting the first optimization component to process the first input data;

determining, by the first optimization component, first historical output data corresponding to a first prior response to a first prior input, wherein the first prior input corresponds to the first input data;

sending an indication of the first optimization component to cause a first language model to process the first input data according to the first technique; and sending the first historical output data to be processed by the first language model to generate first output data responsive to the first input data.

6. The computer-implemented method of claim 5, wherein the first historical output data is retrieved from a first optimization cache associated with the first optimization component, and the method further comprises:

receiving feedback data indicating user satisfaction with the first output data;

based on the first output data and the feedback data, determining performance metric data associated with the processing of the first optimization component; and storing the first output data in the first optimization cache based on the performance metric data.

7. The computer-implemented method of claim 5, wherein the first input data is to be processed using an application, and the method further comprises:

receiving first context data including an application identifier (ID) associated with the application;

using the application ID, retrieving, from a first storage, optimization plan data indicating the first optimization component and a second optimization component of a plurality of optimization components is to be used to generate responses to input data corresponding to the application;

determining, from a second optimization cache associated with the second optimization component, second historical output data corresponding to a second prior response to a second prior input, wherein the second prior input corresponds to the first input data;

determining a first semantic similarity between the first input data and the first historical output data;

determining a second semantic similarity between the first input data and the second historical output data; and based on the first semantic similarity and the second semantic similarity, determining to send the first historical output data to the application, instead of the second historical output data.

8. The computer-implemented method of claim 5, wherein determining the first optimization component is to process the future input data associated with the first set of historical input data further comprises:

based on the first set of historical input data, retrieving, from a first optimization cache associated with the first optimization component, a first set of historical output data determined to be similar to the first set of historical input data;

based on the first set of historical input data, retrieving, from a second optimization cache associated with a second optimization component, a second set of historical output data determined to be similar to the first set of historical input data;

determining the first set of historical output data is larger than the second set of historical output data;

based on the first set of historical output data being larger than the second set of historical output data, determining optimization plan data indicating the first optimization component is preferred to be used to generate responses to the future input data over the second optimization component; and storing the optimization plan data in a first storage, wherein selecting the first optimization component to process the first input data is based at least in part on the optimization plan data.

9. The computer-implemented method of claim 5, further comprising:

determining optimization metrics data representing a performance of processing performed by the first optimization component and a second optimization component with respect to a first set of inputs;

based on the optimization metrics data, determining a first score representing a performance of processing performed by the first optimization component with respect to the first set of inputs;

based on the optimization metrics data, determining a second score representing a performance of processing performed by the second optimization component with respect to the first set of inputs; and based on the first score and the second score, determining optimization plan data indicating that the first optimization component is to be used to generate responses to the future input data, instead of the second optimization component.

10. The computer-implemented method of claim 5, further comprising:

processing the first output data to determine that the first output data is associated with processing performed by a second optimization component; and storing the first output data in a second optimization cache associated with the second optimization component.

11. The computer-implemented method of claim 5, wherein the first input data is to be processed by an application, and the method further comprises:

receiving first context data including an application identifier (ID) associated with the application;

using the application ID, retrieving, from a first storage, optimization plan data indicating the first optimization component and a second optimization component of a plurality of optimization components is to be used to generate responses to input data corresponding to the application, the second optimization component being a preferred optimization component;

performing a first query of a second optimization cache associated with the second optimization component, using the first input data, for second historical output data corresponding to a second prior response to a second prior input, wherein the second prior input corresponds to the first input data;

determining a cache miss occurs with respect to the first query; and based on the cache miss, determining the first historical output data.

12. The computer-implemented method of claim 5, wherein:

the first historical output data includes first model output data corresponding to a first task and second model output data corresponding to a second task, and the first historical output data enables the first language model to generate third model output data corresponding to the first task and fourth model output data corresponding to the second task at least partially in parallel to generate the first output data.

13. A computing system comprising:

at least one processor; and at least one memory comprising instructions that, when executed by the at least one processor, cause the computing system to:

receive a first set of historical input data;

based on the first set of historical input data, determine a first optimization component is to process future input data associated with the first set of historical input data, wherein the first optimization component is associated with a first technique to be performed to respond to the future input data;

receive first input data to be processed, the first input data being associated with the first set of historical input data;

based on the first input data being associated with the first set of historical input data, select the first optimization component to process the first input data;

determine, by the first optimization component, first historical output data corresponding to a first prior response to a first prior input, wherein the first prior input corresponds to the first input data;

send an indication of the first optimization component to cause a first language model to process the first input data according to the first technique; and send the first historical output data to be processed by the first language model to generate first output data responsive to the first input data.

14. The computing system of claim 13, wherein the first historical output data is retrieved from a first optimization cache associated with the first optimization component, and wherein the at least one memory further comprises instructions that, when executed by the at least one processor, further cause the computing system to:

receive feedback data indicating user satisfaction with the first output data;

based on the first output data and the feedback data, determine performance metric data associated with the processing of the first optimization component; and store the first output data in the first optimization cache further based on the performance metric data.

15. The computing system of claim 13, wherein the first input data is to be processed using an application and wherein the at least one memory further comprises instructions that, when executed by the at least one processor, further cause the computing system to:

receive first context data including an application identifier (ID) associated with the application;

use the application ID, retrieving, from a first storage, optimization plan data indicating the first optimization component and a second optimization component of a plurality of optimization components is to be used to generate responses to input data corresponding to the application;

determine, from a second optimization cache associated with the second optimization component, second historical output data corresponding to a second prior response to a second prior input, wherein the second prior input corresponds to the first input data;

determine a first semantic similarity between the first input data and the first historical output data;

determine a second semantic similarity between the first input data and the second historical output data; and based on the first semantic similarity and the second semantic similarity, determine to send the first historical output data to the application, instead of the second historical output data.

16. The computing system of claim 13, wherein the instructions that cause the computing system to determine the first optimization component is to process the future input data associated with the first set of historical input data comprise further instructions that, when executed by the at least one processor, further cause the computing system to:

based on the first set of historical input data, retrieve, from a first optimization cache associated with the first optimization component, a first set of historical output data determined to be similar to the first set of historical input data;

based on the first set of historical input data, retrieve, from a second optimization cache associated with a second optimization component, a second set of historical output data determined to be similar to the first set of historical input data;

determine the first set of historical output data is larger than the second set of historical output data;

based on the first set of historical output data being larger than the second set of historical output data, determine optimization plan data indicating the first optimization component is preferred to be used to generate responses to the future input data over the second optimization component; and store the optimization plan data in a first storage, wherein selecting the first optimization component to process the first input data is based at least in part on the optimization plan data.

17. The computing system of claim 13, wherein the at least one memory further comprises instructions that, when executed by the at least one processor, further cause the computing system to:

determine optimization metrics data representing a performance of processing performed by the first optimization component and a second optimization component with respect to a first set of inputs;

based on the optimization metrics data, determine a first score representing a performance of processing performed by the first optimization component with respect to the first set of inputs;

based on the optimization metrics data, determine a second score representing a performance of processing performed by the second optimization component with respect to the first set of inputs; and based on the first score and the second score, determine optimization plan data indicating that the first optimization component is to be used to generate responses to the future input data, instead of the second optimization component.

18. The computing system of claim 13, wherein the at least one memory further comprises instructions that, when executed by the at least one processor, further cause the computing system to:

process the first output data to determine that the first output data is associated with processing performed by a second optimization component; and store the first output data in a second optimization cache associated with the second optimization component.

19. The computing system of claim 13, wherein the first input data is to be processed by an application and wherein the at least one memory further comprises instructions that, when executed by the at least one processor, further cause the computing system to:

receive first context data including an application identifier (ID) associated with the application;

using the application ID, retrieve, from a first storage, optimization plan data indicating the first optimization component and a second optimization component of a plurality of optimization components is to be used to generate responses to input data corresponding to the application, the second optimization component being a preferred optimization component;

perform a first query of a second optimization cache associated with the second optimization component, using the first input data, for second historical output data corresponding to a second prior response to a second prior input, wherein the second prior input corresponds to the first input data;

determine a cache miss occurs with respect to the first query; and based on the cache miss, determine the first historical output data.

20. The computing system of claim 13, wherein:

the first historical output data includes first model output data corresponding to a first task and second model output data corresponding to a second task, and the first historical output data enables the first language model to generate third model output data corresponding to the first task and fourth model output data corresponding to the second task at least partially in parallel to generate the first output data.

* * * * *